(12) United States Patent
Masuda et al.

(10) Patent No.: US 12,151,165 B2
(45) Date of Patent: Nov. 26, 2024

(54) STORAGE MEDIUM STORING GAME PROGRAM, GAME APPARATUS, GAME SYSTEM, AND GAME PROCESSING METHOD

(71) Applicants: Nintendo Co., Ltd., Kyoto (JP); The Pokémon Company, Tokyo (JP)

(72) Inventors: Junichi Masuda, Tokyo (JP); Yuichi Ueda, Tokyo (JP)

(73) Assignees: NINTENDO CO., LTD., Kyoto (JP); THE POKEMON COMPANY, Tokyo (JP)

( * ) Notice: Subject to any disclaimer, the term of this patent is extended or adjusted under 35 U.S.C. 154(b) by 254 days.

(21) Appl. No.: 17/882,639

(22) Filed: Aug. 8, 2022

(65) Prior Publication Data

US 2023/0056381 A1 Feb. 23, 2023

(30) Foreign Application Priority Data

Aug. 17, 2021 (JP) .................................. 2021-132781

(51) Int. Cl.
*A63F 13/63* (2014.01)
*A63F 13/533* (2014.01)
*A63F 13/55* (2014.01)

(52) U.S. Cl.
CPC ............ *A63F 13/533* (2014.09); *A63F 13/55* (2014.09); *A63F 13/63* (2014.09)

(58) Field of Classification Search
CPC ......... A63F 13/55; A63F 13/63; A63F 13/533
See application file for complete search history.

(56) References Cited

U.S. PATENT DOCUMENTS

2002/0082082 A1\* 6/2002 Stamper .................. A63F 13/63
463/32
2021/0004143 A1 1/2021 Cooke

FOREIGN PATENT DOCUMENTS

| JP | 2011-087625 | 5/2011 |
| JP | 2016-087007 | 5/2016 |
| JP | 2021-519481 | 8/2021 |

OTHER PUBLICATIONS

Sep. 22, 2023 Office Action issued in Japanese Patent Application No. 2021-132781, pp. 1-2 [machine translation included].

(Continued)

*Primary Examiner* — Jay Trent Liddle
(74) *Attorney, Agent, or Firm* — Nixon & Vanderhye, PC

(57) ABSTRACT

When a first user interface is chosen according to a choice instruction based on an operation input, a two-dimensional user interface object indicating an arrangement range of decorative items is displayed, and decorative items are disposed at locations in the range designated according to an operation input. When a second user interface is chosen, a three-dimensional user interface object indicating an arrangement range of decorative items is displayed, and decorative items are disposed at locations in the range designated according to an operation input. Types and arrangement of the decorative items on the two-dimensional object, or types and arrangement of the decorative items on the three-dimensional object, are stored into a storage medium according to a determination instruction based on an operation input.

36 Claims, 18 Drawing Sheets

(56) References Cited

OTHER PUBLICATIONS

The Crew 2—Stickershop (How to find the 2D-mode / How to create a stickergroup) [Tutorial], YouTube [online] [video], Jul. 5, 2018, [Search date: Sep. 8, 2023], https://www.youtube.com/watch?y=v3xpNY57R0Q , pp. 1-5.

"Pokémon Diamond Pokemon Pearl", Scenario Clear Book, Mainichi Communications Inc, Oct. 10, 2006, 6 pages including English Translation.

\* cited by examiner

STORAGE MEDIUM STORING GAME PROGRAM, GAME APPARATUS, GAME SYSTEM, AND GAME PROCESSING METHOD

CROSS-REFERENCE TO RELATED APPLICATION

This application claims priority to Japanese Patent Application No. 2021-132781, filed on Aug. 17, 2021, the entire contents of which are incorporated herein by reference.

FIELD

The technology disclosed herein relates to game program-storing storage media, game apparatuses, game systems, and game processing methods for performing a process according to an operation input.

BACKGROUND AND SUMMARY

There is a conventional game program in which a sticker addition screen on which a sticker is attached to a spherical item according to an operation input is displayed on a screen.

However, in the above game program, although an item to be decorated is a ball item, a decoration addition operation is performed using an image of the item that is two-dimensionally displayed.

With the above in mind, it is an object of the present non-limiting example to provide a game program-storing storage medium, game apparatus, game system, and game processing method that are capable of improving the convenience of performing an operation of decorating an item.

To achieve the object, the present non-limiting example may have the following features, for example.

In an exemplary configuration of a non-transitory computer-readable storage medium having stored therein a game processing program according to the exemplary embodiment, a non-transitory computer-readable storage medium having stored therein a game program that when executed by a computer of an information processing apparatus, causes the computer to perform operations including: in a decoration arrangement situation that a plurality of decorative items to be added to a first item are disposed in a game, selectively switching a user interface between a first user interface and a second user interface according to a choice instruction based on an operation input, when the first user interface is chosen, displaying a two-dimensional user interface object indicating an arrangement range of the decorative items, and disposing the decorative items at locations in the range on the two-dimensional user interface object designated according to an operation input, when the second user interface is chosen, displaying a three-dimensional user interface object indicating an arrangement range of the decorative items, and disposing the decorative items at locations in the range on the three-dimensional user interface object designated according to an operation input, and storing, into a storage medium, types and arrangement of the decorative items on the two-dimensional object, or types and arrangement of the decorative items on the three-dimensional object, according to a determination instruction based on an operation input; and in an item use situation that the first item is used in a game, displaying the first item, and displaying a scene based the types and arrangement of the decorative items associated with the first item.

Thus, the first user interface displaying the two-dimensional user interface object or the second user interface displaying the three-dimensional user interface object is selectively used to dispose a plurality of decorative items to be added to the first item. Therefore, convenience can be improved in decorating an item.

Further, a surface of the two-dimensional user interface object that is displayed may be allowed to be selectively switched between a front surface and a back surface thereof. The game program further may cause the computer to perform operations comprising: when the first user interface is chosen, choosing the front surface or the back surface according to an operation input, and disposing the decorative items at the designated locations on the chosen front surface or back surface.

Thus, decorative items can be disposed on each of the front and back surfaces of the two-dimensional user interface object. Therefore, convenience can be further improved in decorating an item.

Further, the two-dimensional user interface object may have a plurality of arrangement portions arranged in a grid pattern. The game program further may cause the computer to perform operations comprising: when the first user interface is chosen, disposing the decorative items at the arrangement portions designated according to an operation input.

Thus, decorative items are allowed to be disposed in a plurality of arrangement portions arranged in a grid pattern. Therefore, an operation of disposing decorative items can be facilitated.

Further, the three-dimensional user interface object may be rotatable. The game program further may cause the computer to perform operations comprising: when the second user interface is chosen, rotating the three-dimensional user interface according to an operation input, and disposing the decorative items at the designated locations on a surface of the object closer to a user.

Thus, the three-dimensional user interface object is rotatable, which allows decorative items to be disposed on the entire surface of the object. Therefore, convenience can be further improved in decorating an item.

Further, the three-dimensional user interface object may be a translucent object that allows the decorative items disposed on a back surface of the object to be seen.

Thus, all of the disposed decorative items can be viewed at a glance.

Further, the first item may be a spherical item. The two-dimensional user interface object may be a circular object. The three-dimensional user interface object may be a spherical object.

Thus, a spherical item can be intuitively decorated no matter which of the two-dimensional user interface object and the three-dimensional user interface object is used.

Further, the game program further may cause the computer to perform operations comprising: when a preview instruction is performed according to an operation input in the decoration arrangement situation, displaying the first item, and performing preview display that displays a scene based on the types and arrangement of the decorative items disposed on the two-dimensional user interface object or the three-dimensional user interface object associated with the first item.

Thus, a state of decoration can be easily recognized.

Further, the game program further may cause the computer to perform operations comprising: storing, into the storage medium, a plurality of at least any of the types and arrangement of the decorative items disposed on the two-dimensional user interface object and the types and arrangement of the decorative items disposed on the three-dimensional user interface object, and storing, into the storage medium, one of a plurality of the first items designated according to an operation input and the types and arrangement of the decorative items designated according to an operation input in association with each other.

Thus, a plurality of first items that have been decorated can be prepared.

Further, the plurality of first items may be stored in the storage medium in association with a plurality of characters, respectively, used in a game. In the item use situation, at least any of the plurality of characters may appear in a virtual space. The game program further may cause the computer to perform operations comprising: when displaying the first item associated with the character and causing the character to appear in a game, displaying the scene based on the types and arrangement of the decorative items associated with the first item.

Thus, convenience can be improved in setting a scene that a character appears in a virtual space.

The exemplary embodiment may be carried out in the forms of a game apparatus, game system, and game processing method.

According to the present non-limiting example, convenience can be improved in decorating an item.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present non-limiting example is described, and thereafter, the control of the game system 1 of the present non-limiting example is described.

Figure 1:
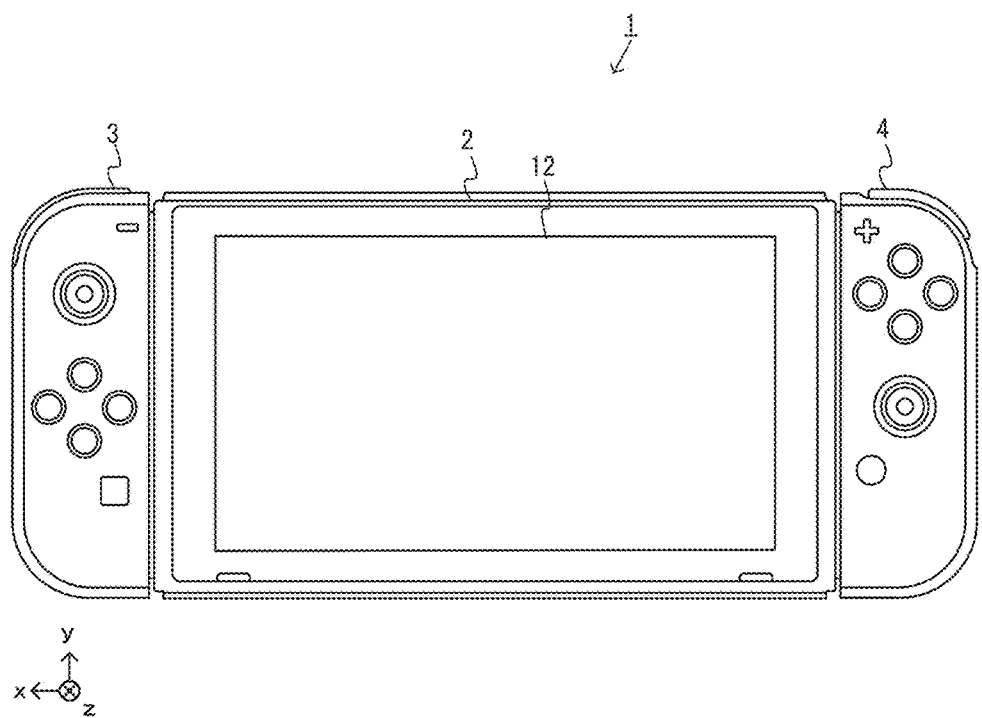
FIG. 1 is a diagram illustrating a non-limiting example of a state where a left controller 3 and a right controller 4 are attached to a main body apparatus 2.

FIG. 1 is a diagram illustrating a non-limiting example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
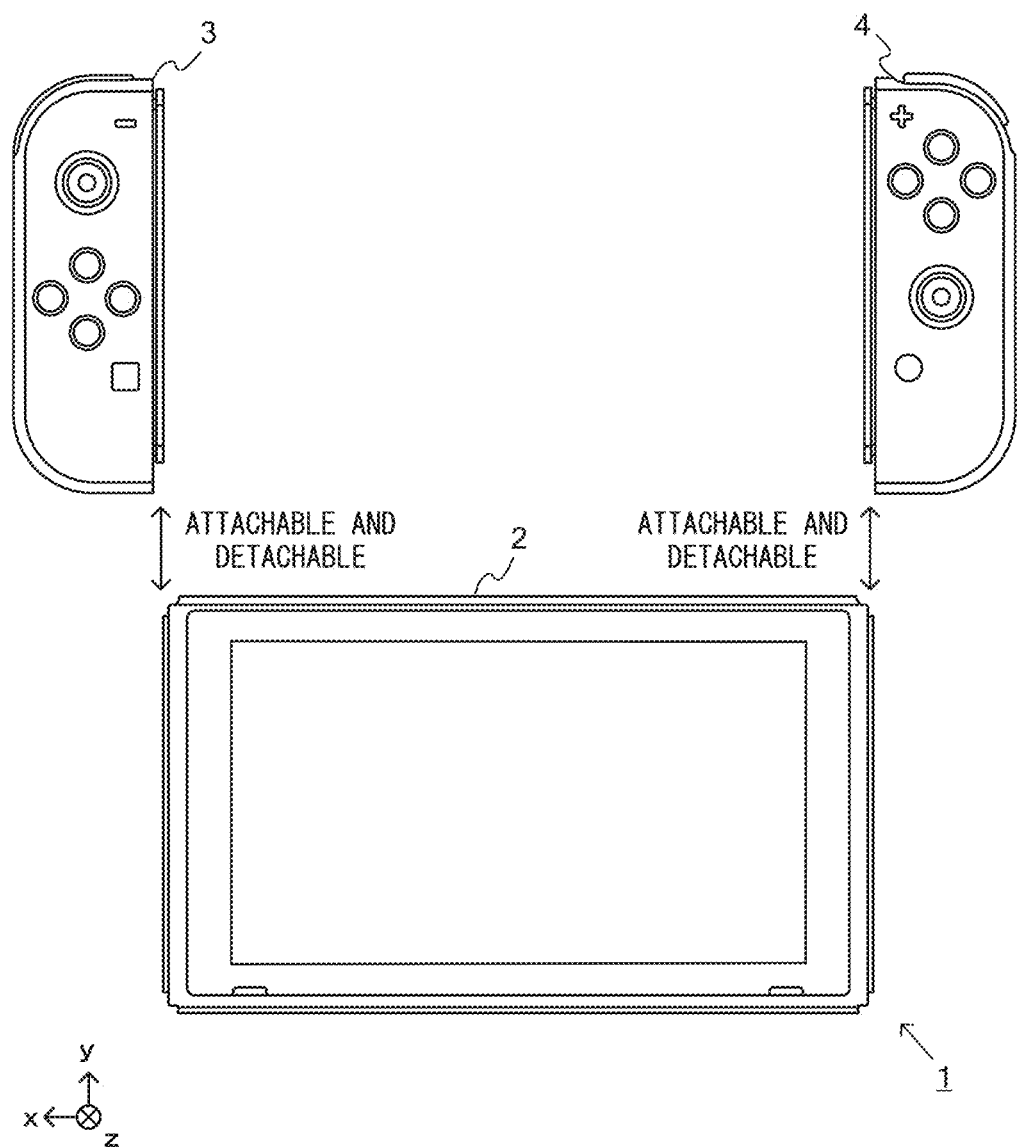
FIG. 2 is a diagram illustrating a non-limiting example of a state where a left controller 3 and a right controller 4 are detached from a main body apparatus 2.

FIG. 2 is a diagram illustrating a non-limiting example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
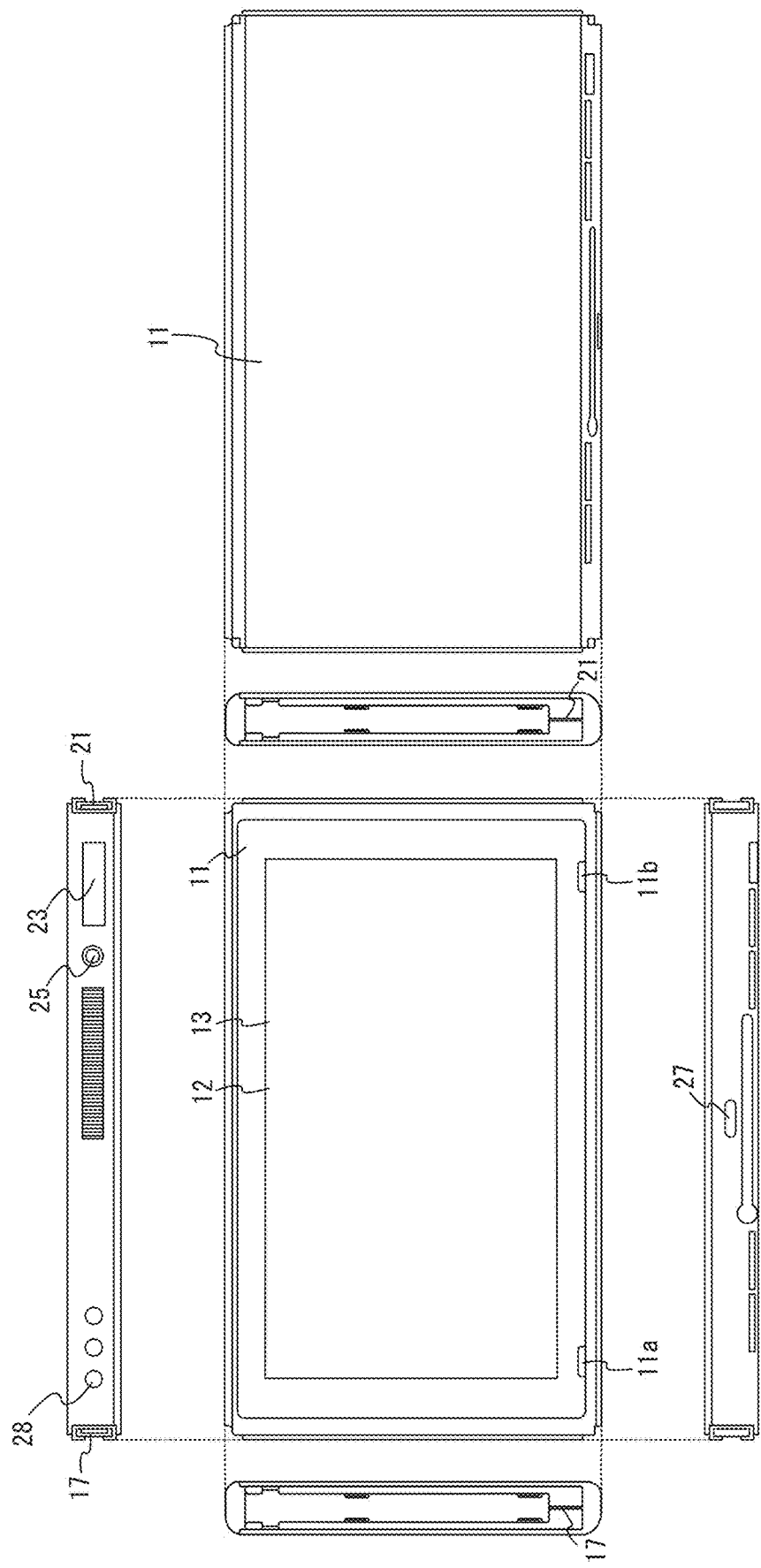
FIG. 3 is six orthogonal views illustrating a non-limiting example of a main body apparatus 2.

FIG. 3 is six orthogonal views illustrating a non-limiting example of the main body apparatus 2. As illustrated in FIG. 3, the main body apparatus 2 includes an approximately plate-shaped housing 11. In the present non-limiting example, a main surface (in other words, a surface on a front side, i.e., a surface on which the display 12 is provided) of the housing 11 has a generally rectangular shape.

It should be noted that the shape and the size of the housing 11 are optional. As a non-limiting example, the housing 11 may be of a portable size. Further, the main body apparatus 2 alone or the unified apparatus obtained by attaching the left controller 3 and the right controller 4 to the main body apparatus 2 may function as a mobile apparatus.

The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present non-limiting example, the display 12 is a liquid crystal display device (LCD). The display 12, however, may be a display device of any suitable type.

In addition, the main body apparatus 2 includes a touch panel 13 on the screen of the display 12. In the present non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present non-limiting example, the cradle has the function of charging the unified apparatus or the main body apparatus 2 alone, being placed thereon. The cradle also functions as a hub device (specifically, a USB hub).

Figure 4:
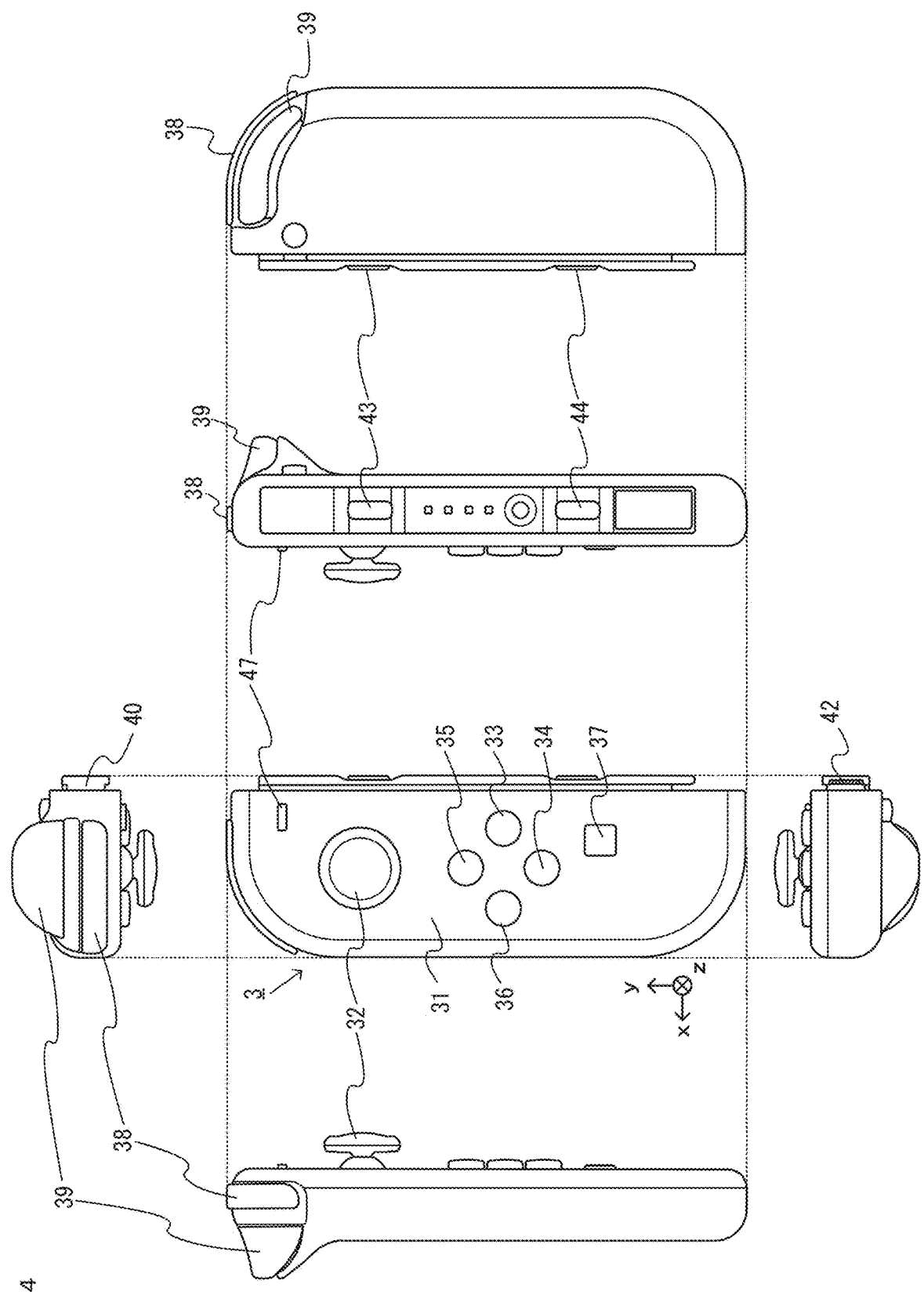
FIG. 4 is six orthogonal views illustrating a non-limiting example of a left controller 3.

FIG. 4 is six orthogonal views illustrating a non-limiting example of the left controller 3. As illustrated in FIG. 4, the left controller 3 includes a housing 31. In the present non-limiting example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
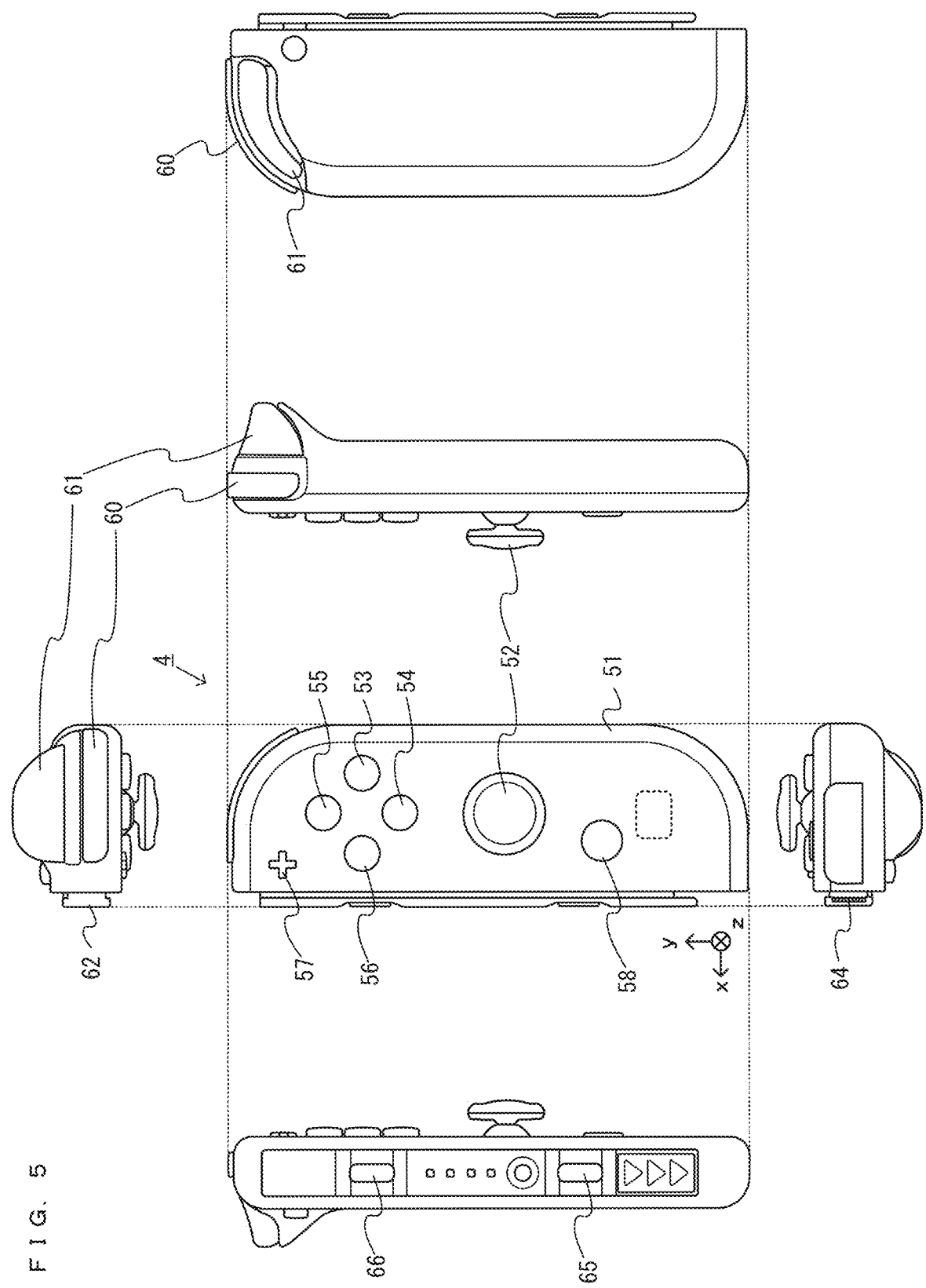
FIG. 5 is six orthogonal views illustrating a non-limiting example of a right controller 4.

FIG. 5 is six orthogonal views illustrating a non-limiting example of the right controller 4. As illustrated in FIG. 5, the right controller 4 includes a housing 51. In the present non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
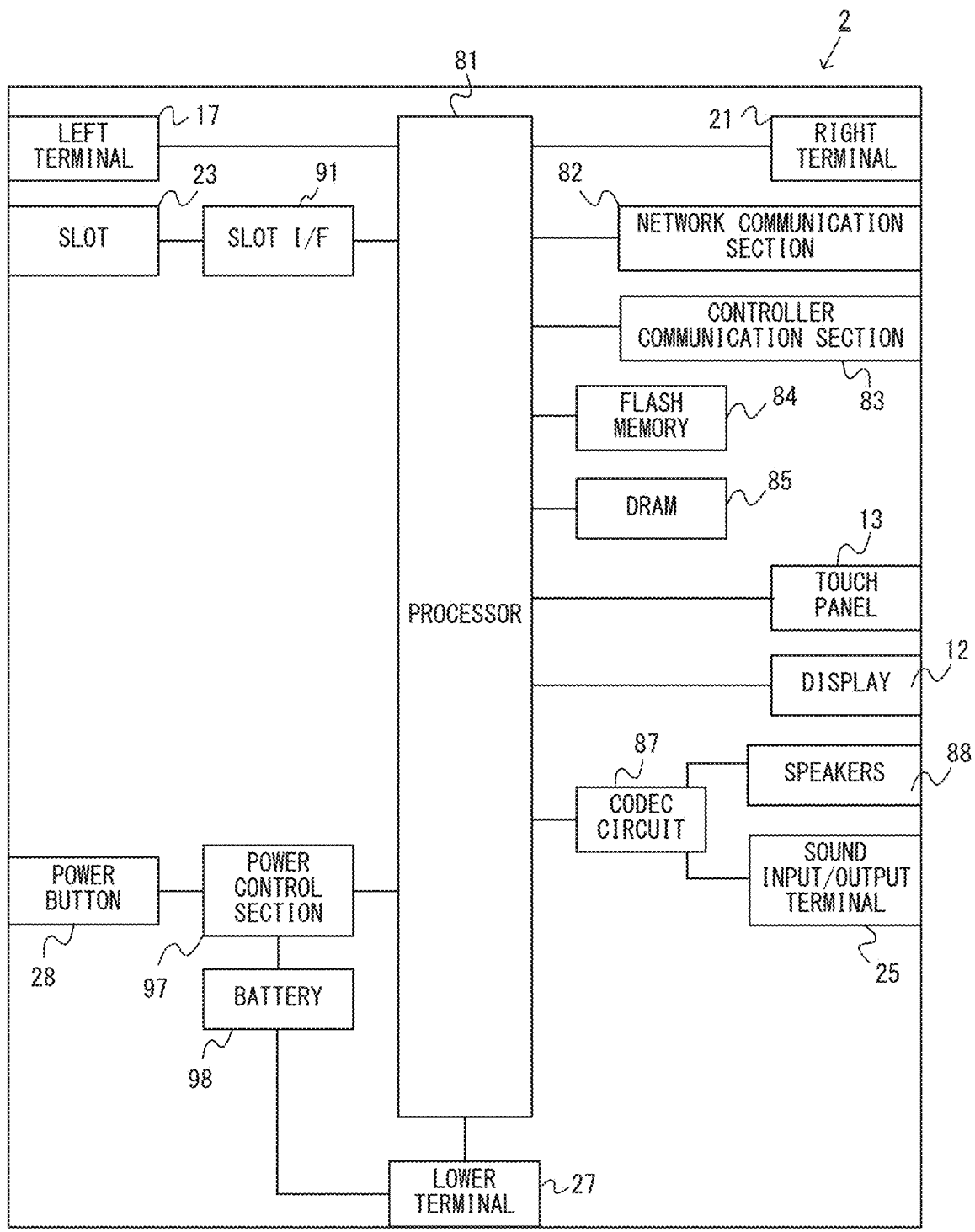
FIG. 6 is a block diagram illustrating a non-limiting example of an internal configuration of a main body apparatus 2.

FIG. 6 is a block diagram illustrating a non-limiting example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As a non-limiting example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
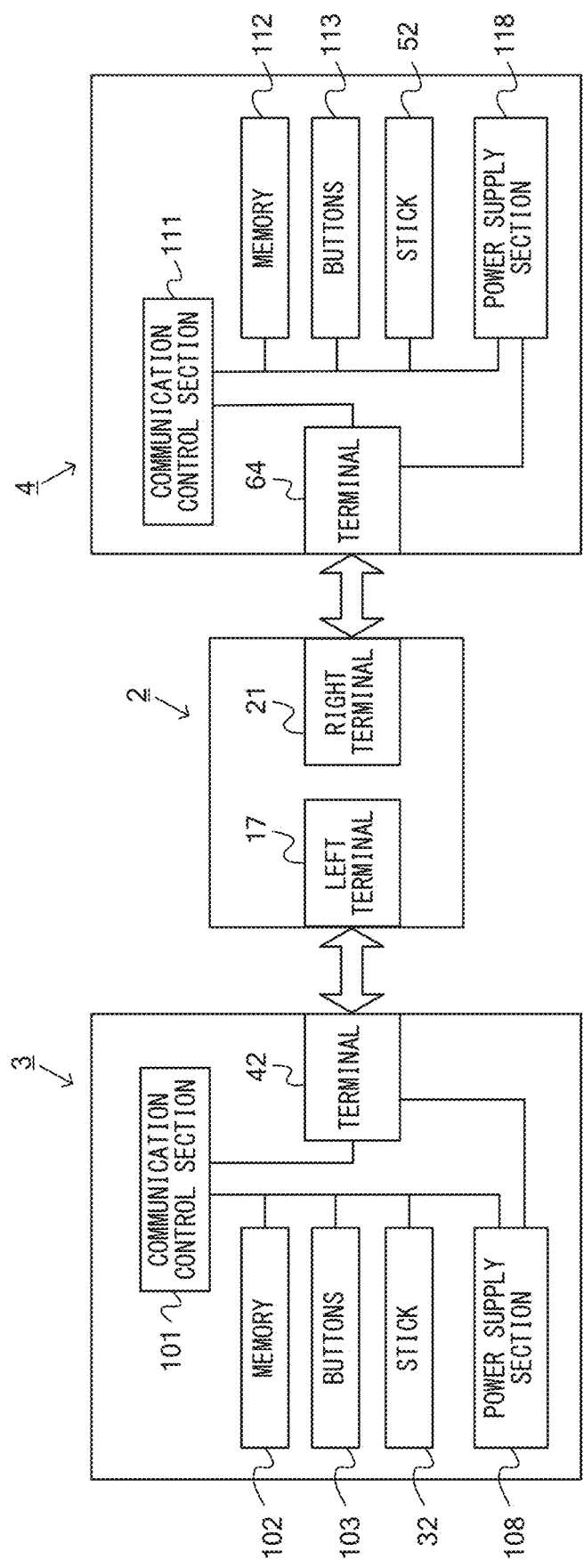
FIG. 7 is a block diagram illustrating examples of internal configurations of a main body apparatus 2, a left controller 3, and a right controller 4.

FIG. 7 is a block diagram illustrating non-limiting examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present non-limiting example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present non-limiting example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section III is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present non-limiting example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to a non-limiting embodiment in which an image is displayed on the display 12.

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present non-limiting example, as a non-limiting example, a game can be played using objects such as a player character PC existing in the virtual space and a character C disposed in the virtual space, according to the user's operation using the operation buttons and sticks, and the touch panel 13.

Figure 8:
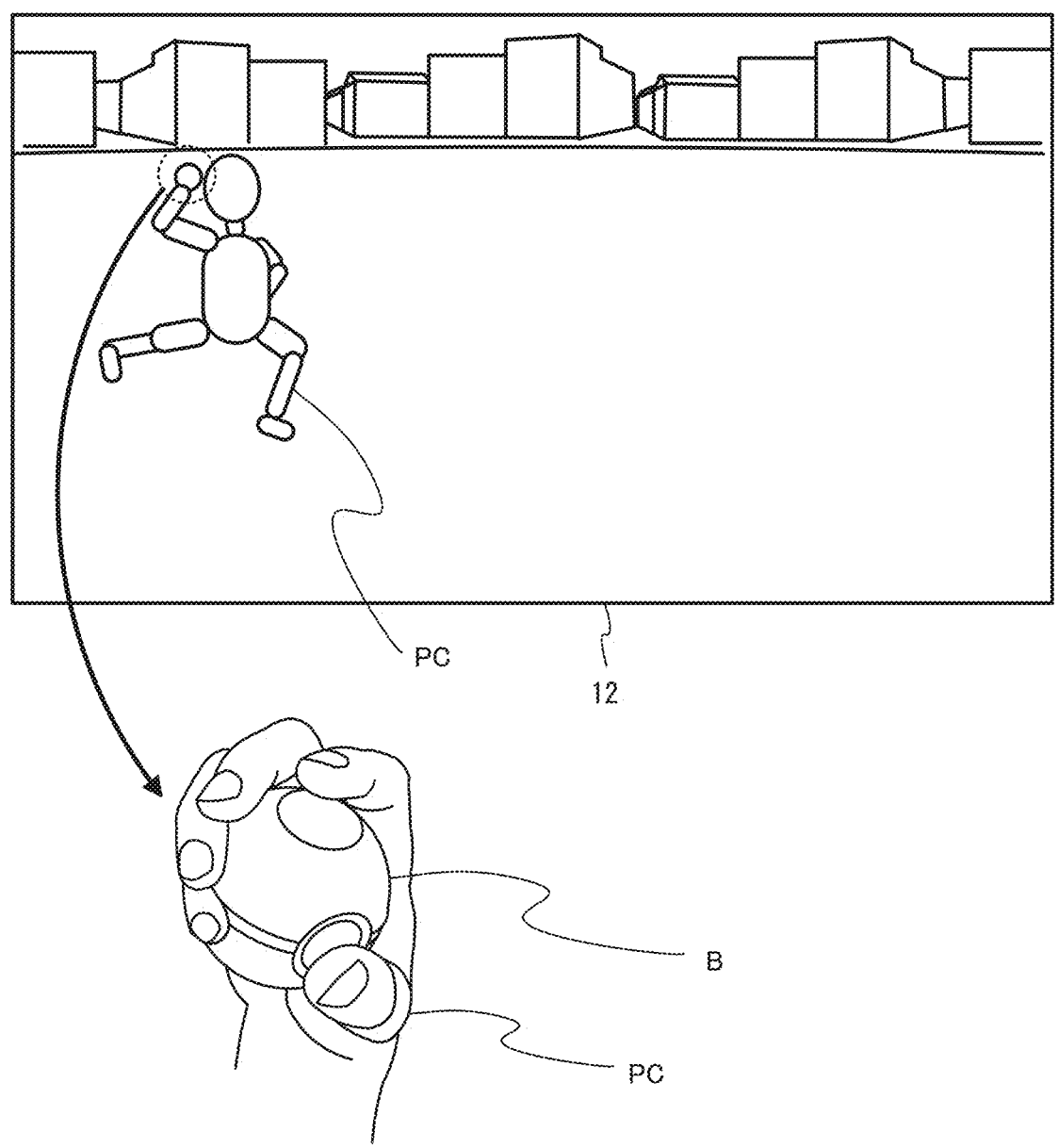
FIG. 8 is a diagram illustrating a non-limiting example of a game image in a first stage of a ball item use scene.
Figure 9:
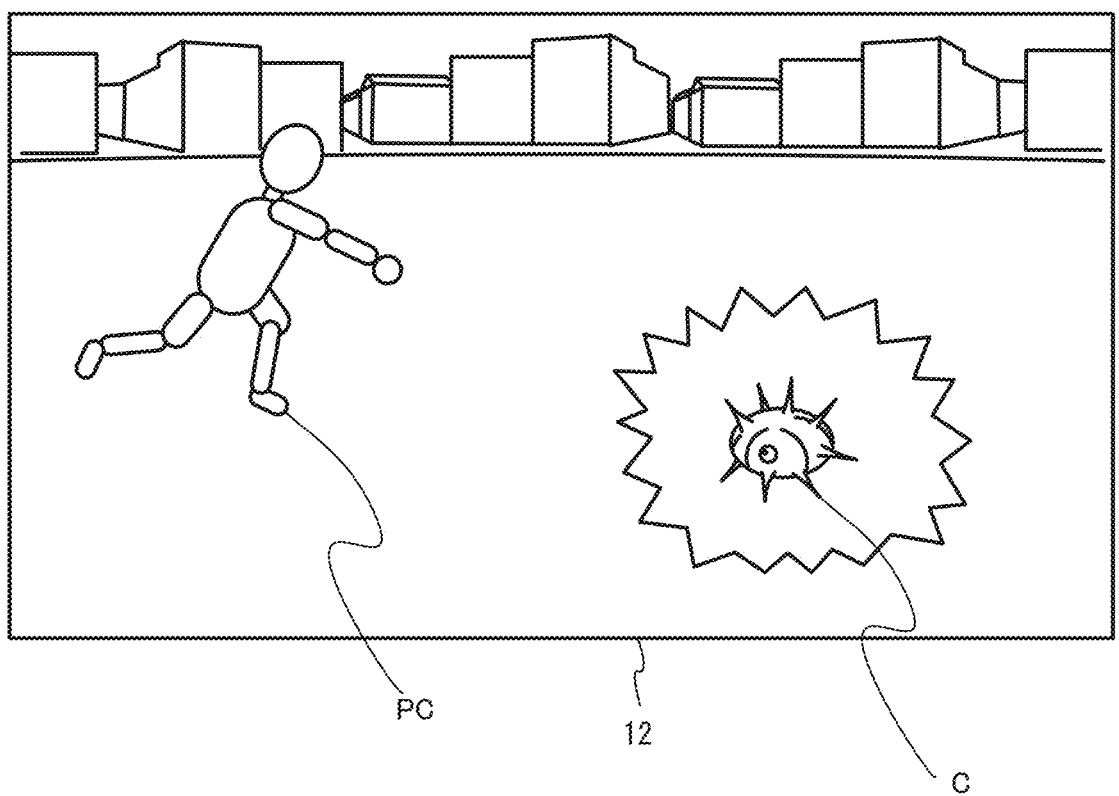
FIG. 9 is a diagram illustrating a non-limiting example of a game image in a second stage of a ball item use scene.
Figure 10:
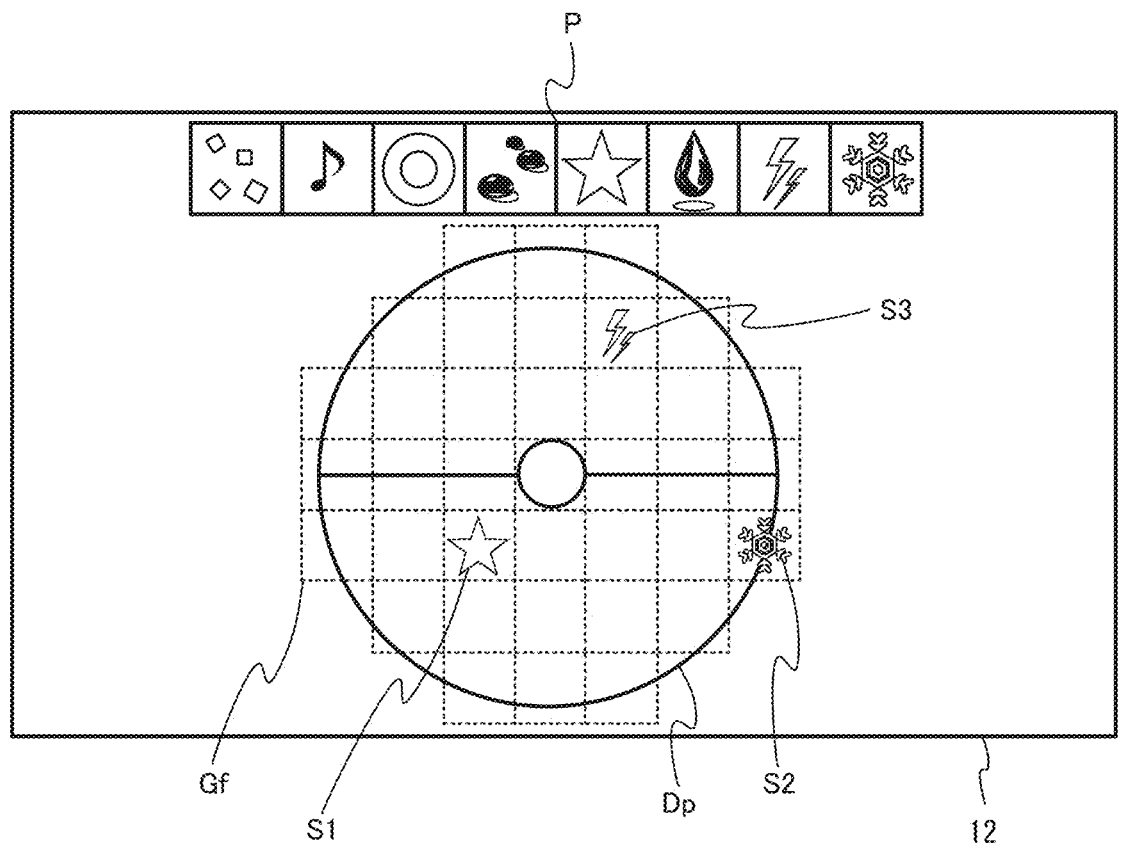
FIG. 10 is a diagram illustrating a non-limiting example of a game image in which a capsule D is edited using a front surface of a two-dimensional user interface object Dp.
Figure 11:
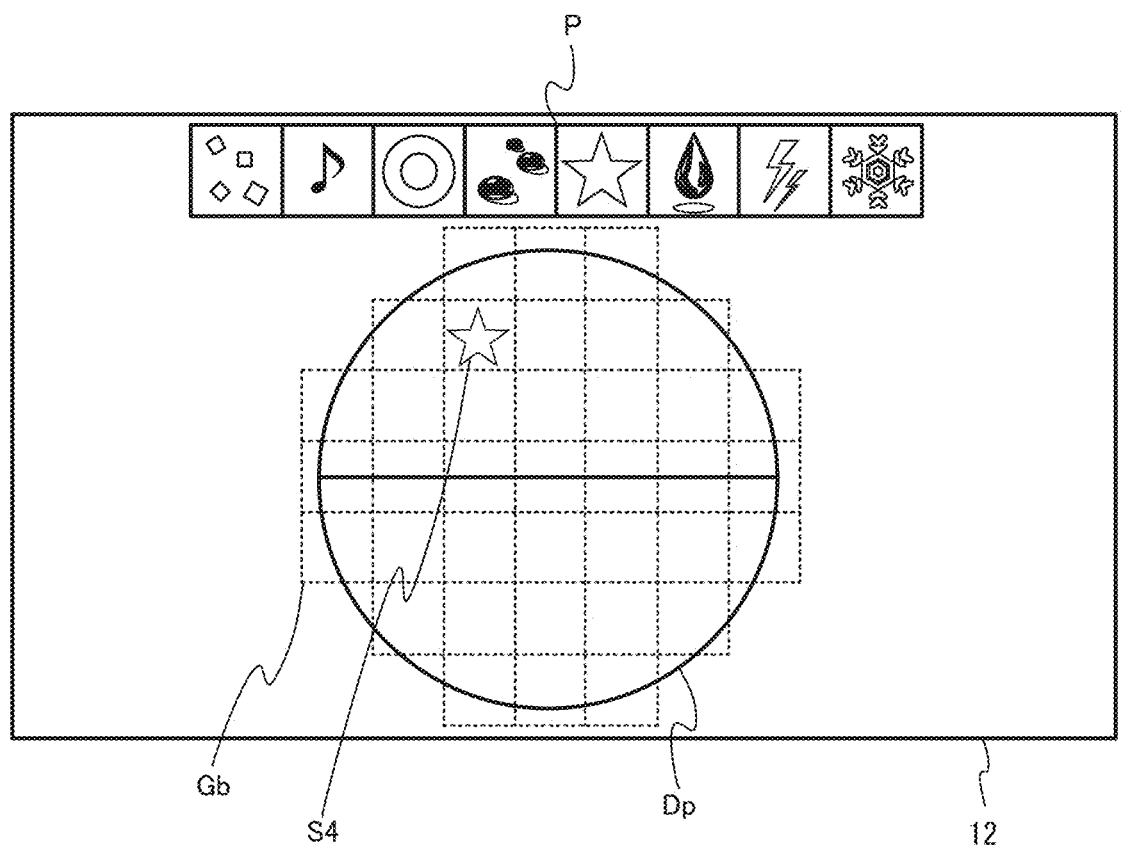
FIG. 11 is a diagram illustrating a non-limiting example of a game image in which a capsule D is edited using a back surface of a two-dimensional user interface object Dp.
Figure 12:
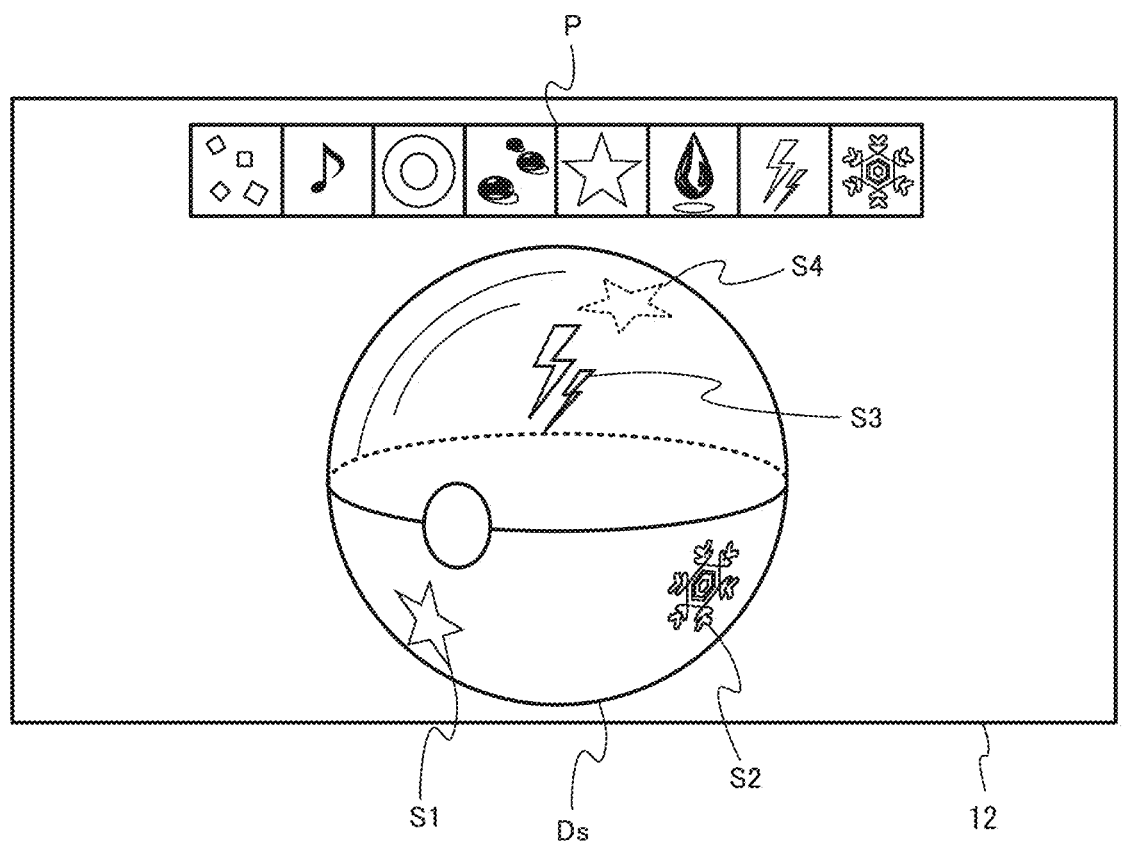
FIG. 12 is a diagram illustrating a non-limiting example of a game image in which a capsule D is edited using a three-dimensional user interface object Ds.

An overview of a game process that is executed in the game system 1 will be described with reference to FIGS. 8-12. It should be noted that FIG. 8 is a diagram illustrating a non-limiting example of a game image in a first stage of a ball item use scene. FIG. 9 is a diagram illustrating a non-limiting example of a game image in a second stage of a ball item use scene. FIG. 10 is a diagram illustrating a non-limiting example of a game image in which a capsule D is edited using a front surface of a two-dimensional user interface object Dp. FIG. 11 is a diagram illustrating a non-limiting example of a game image in which a capsule D is edited using a back surface of a two-dimensional user interface object Dp. FIG. 12 is a diagram illustrating a non-limiting example of a game image in which a capsule D is edited using a three-dimensional user interface object Ds.

Figure 13:
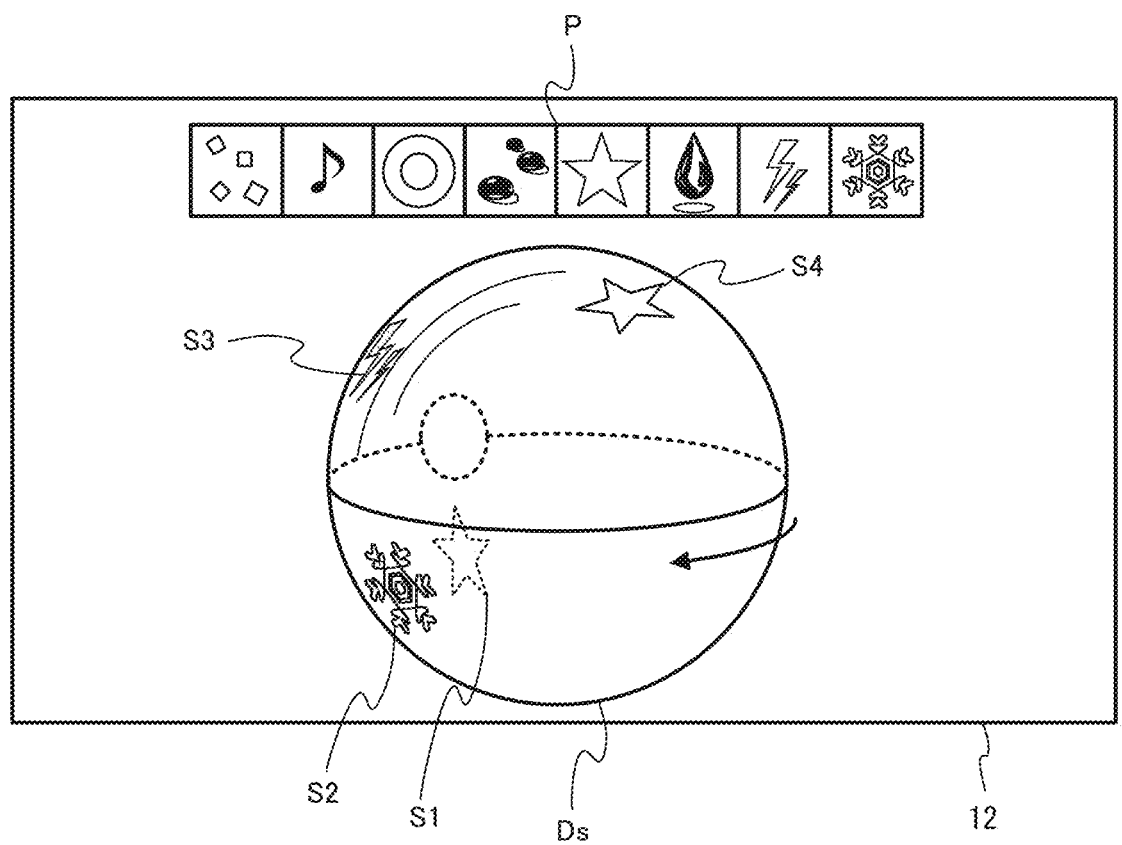
FIG. 13 is a diagram illustrating a non-limiting example of a game image in which a capsule D is edited with a three-dimensional user interface object Ds rotated.
Figure 14:
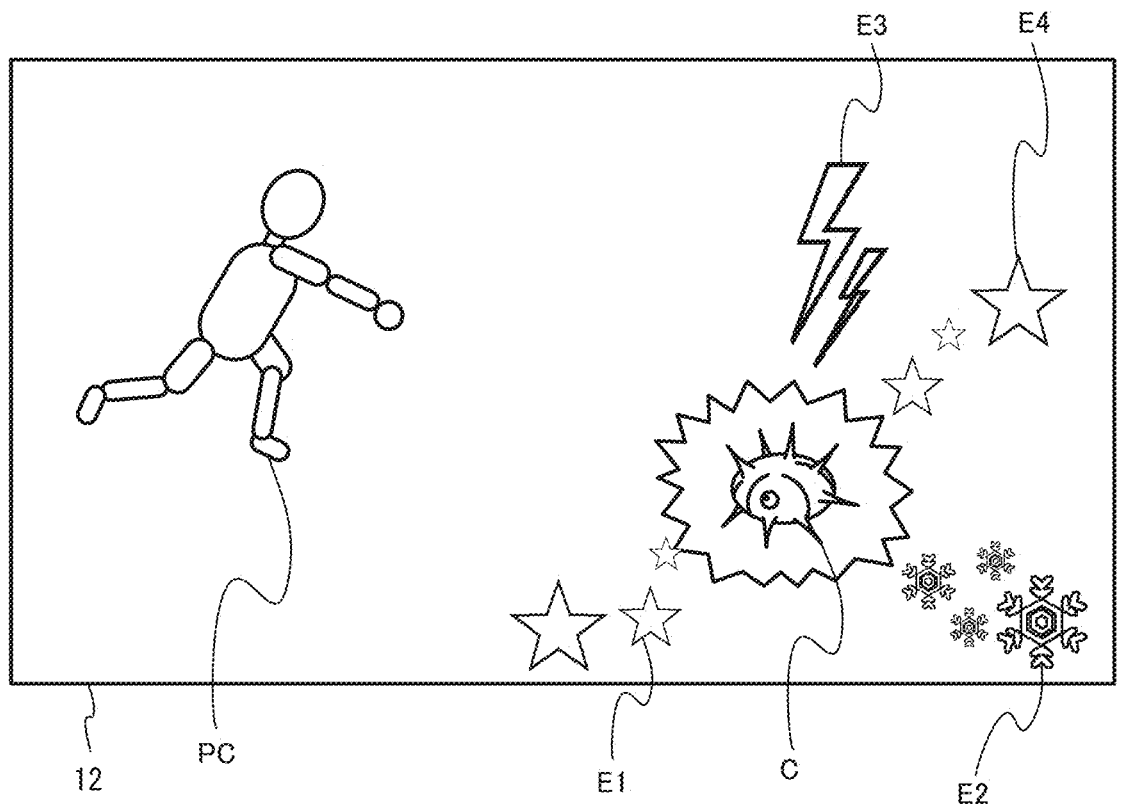
FIG. 14 is a diagram illustrating a non-limiting example of a preview image that is displayed during editing of a capsule D.
Figure 15:
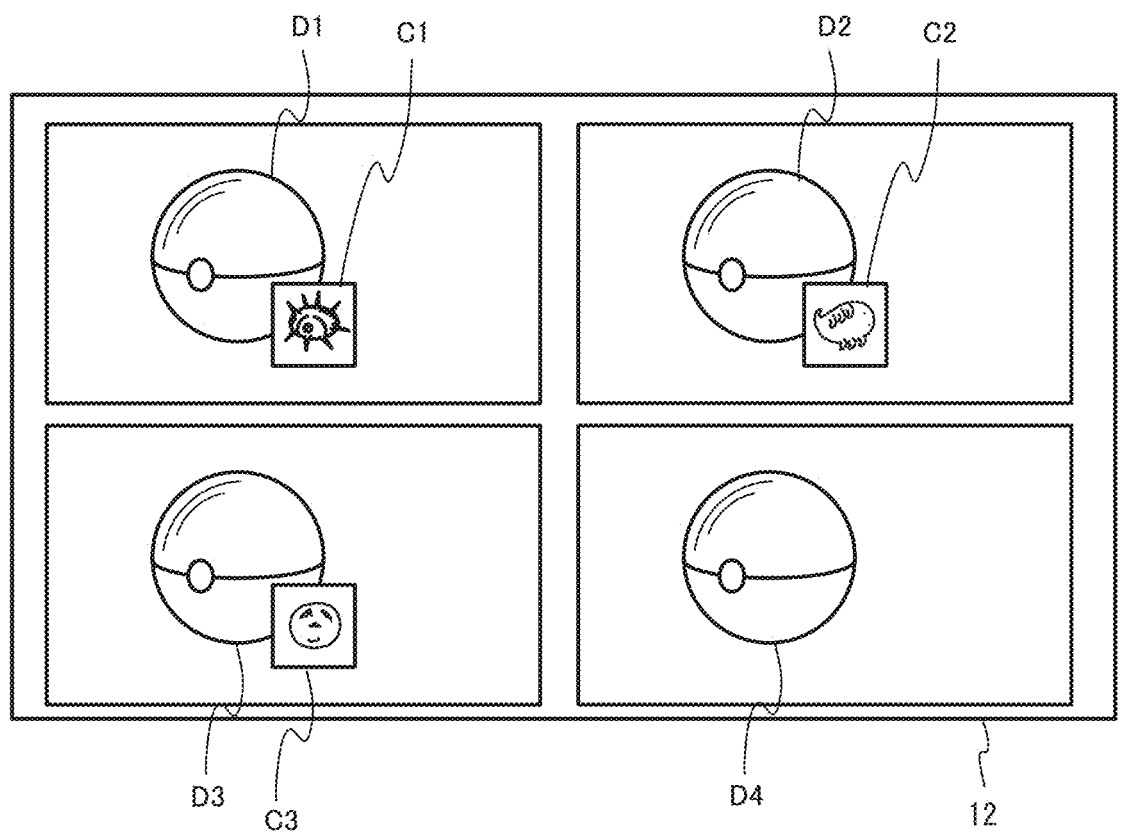
FIG. 15 is a diagram illustrating a non-limiting example of a capsule list image that displays a plurality of sets of capsules D attached or not attached to a ball item B.

FIG. 13 is a diagram illustrating a non-limiting example of a game image in which a capsule D is edited with a three-dimensional user interface object Ds rotated. FIG. 14 is a diagram illustrating a non-limiting example of a preview image that is displayed during editing of a capsule D. FIG. 15 is a diagram illustrating a non-limiting example of a capsule list image that displays a plurality of sets of capsules D attached or not attached to a ball item B.

In FIG. 8, a game image in which a player character PC is disposed in a virtual space is displayed on the game system 1 of the display 12. The player character PC performs an action in the virtual space according to the user's operation. The player character PC of FIG. 8 is holding a ball item B, and is performing an action of throwing the held ball item B in the virtual space. Here, the ball item B contains a character C. When the player character PC throws the ball item B in a predetermined direction, the character C contained in the ball item B is allowed to appear in the virtual space. In addition, when a character C is disposed in the virtual space, then if the player character PC performs a predetermined packing action such as throwing the ball item B to the character C, the character C can be put into the ball item B.

In FIG. 9, a game image showing how a character C appears from a ball item B after the ball item B is thrown in the virtual space is displayed on the display 12. For example, a ball item use scene is displayed in which after being thrown, a ball item B is opened in the air or on the ground in the virtual space, and then a character C appears from the ball item B while a predetermined effect is added. It should be noted that after the ball item use scene is finished, the ball item B is temporarily returned to or near the player character PC, and is thus carried or possessed by the player character PC without the character C being contained in the ball item B. Thereafter, the player character PC performs the predetermined packing action so that the character C is put back into the ball item B, and therefore, the ball item B is carried or possessed by the player character PC with the character C contained in the ball item B.

Here, a capsule D can be attached to a ball item B. In the ball item use scene that a character C appears, a capsule D serves as a tool that provides various effects when the capsule D is attached to a ball item B. A capsule D may not be actually displayed in a game scene such as the ball item use scene. A capsule D is a unit of arrangement and storage of a plurality of stickers S for which an effect is set, which is the concept including a user interface for setting the types and arrangement of stickers S. Also, a sticker S serves as an item for decorating a ball item B. and is added to a ball item B through a capsule D when the capsule D is attached to the ball item B. Therefore, stickers S are not directly added to a ball item B or do not directly decorate a ball item B, and are arranged on a capsule D, which is attached and added to a ball item B. It should be noted that in another non-limiting example, stickers S, which are for decorating a ball item B, may be directly added to a ball item B for decoration. A ball item B corresponds to a non-limiting example of a first item. A sticker S corresponds to a non-limiting example of a decorative item that is added to a first item.

The types and arrangement of a plurality of stickers S which are added to a capsule D can be edited according to the user's operation. In the present non-limiting example, a two-dimensional user interface that represents an arrangement range of a capsule D using a front surface and a back surface of a two-dimensional user interface object Dp, and a three-dimensional user interface that represents an arrangement range of a capsule D using a three-dimensional user interface object Ds, can be selectively changed and used by the user. It should be noted that in the present non-limiting example, the two-dimensional user interface object Dp and the three-dimensional user interface object Ds are each used to represent the arrangement range of stickers S, which is the arrangement range of stickers S on a capsule D, but not the arrangement range on a ball item B. It should be noted that the two-dimensional user interface corresponds to a non-limiting example of a first user interface, and the two-dimensional user interface object Dp corresponds to a non-limiting example of a two-dimensional user interface object. The three-dimensional user interface corresponds to a non-limiting example of a second user interface, and the three-dimensional user interface object Ds corresponds to a non-limiting example of a three-dimensional user interface object.

In FIG. 10, when the user chooses the two-dimensional user interface, the two-dimensional user interface object Dp and a sticker palette P are displayed on the display 12. It should be noted that the two-dimensional user interface object Dp is a two-dimensional circular object having a front surface and a back surface. In the non-limiting example of FIG. 10, the front surface of the two-dimensional user interface object Dp is being displayed.

The sticker palette P indicates a plurality of types of previously prepared stickers S that can be added to and disposed on a capsule D. The user can perform an operation of choosing any sticker S that the user desires to add to a capsule D, from the plurality of stickers S in the sticker palette P.

A sticker S chosen by the user is disposed at a location on the front surface of the two-dimensional user interface object Dp that is designated according to the user's operation. In the present non-limiting example, the front surface of the two-dimensional user interface object Dp has a plurality of front surface grid squares Gf arranged in a grid pattern as portions in which a sticker S is allowed to be disposed. A chosen sticker S is disposed in a front surface grid square Gf designated according to the user's operation. Specifically, as indicated by stickers S1-S3 disposed in FIG. 10, a sticker S is allowed to be disposed in each front surface grid square Gf. As a non-limiting example, a sticker S is disposed such that the front surface grid square Gf and the sticker S are concentric.

In the example of FIG. 10, the arrangement range of the front side of a spherical ball item B with a capsule D attached thereto is displayed as the front surface of the two-dimensional user interface object Dp, and a plurality of front surface grid squares Gf are set as the arrangement portions of the front surface of the two-dimensional user interface object Dp. Therefore, when the two-dimensional user interface displaying the front surface of the two-dimensional user interface object Dp is used, a sticker S disposed in a front surface grid square Gf is disposed on the front side of the ball item B through the capsule D.

During editing of a capsule D using the two-dimensional user interface, the front and back surfaces of the two-dimensional user interface object Dp can be selectively changed and displayed according to a choice instruction based on the user's operation input. For example, when the choice instruction is performed with the front surface of the two-dimensional user interface object Dp of FIG. 10 displayed, the back surface of the two-dimensional user interface object Dp of FIG. 11 is displayed.

In FIG. 11, when the display is switched to the back surface of the two-dimensional user interface object Dp, the back surface of the two-dimensional user interface object Dp and the sticker palette P are displayed on the display 12. Like when the front surface is displayed, the sticker palette P shows a plurality of types of previously prepared stickers S that can be added to and disposed on a capsule D.

A sticker S chosen by the user with the back surface of the two-dimensional user interface object Dp displayed is disposed at a location on the back surface of the two-dimensional user interface object Dp that is designated according to the user's operation. In the present non-limiting example, the back surface of the two-dimensional user interface object Dp has a plurality of back surface grid squares Gb arranged in a grid pattern are provided as portions in which a sticker S is allowed to be disposed. Like the front surface grid squares Gf, a chosen sticker S is disposed in a back surface grid square Gb designated according to the user's operation. It should be noted that the front surface grid squares Gf and the back surface grid squares Gb correspond to a non-limiting example of a plurality of arrangement portions arranged in a grid pattern.

In the non-limiting example of FIG. 11, the arrangement range on the back surface of a spherical ball item B with a capsule D attached thereto is displayed as the back surface of the two-dimensional user interface object Dp, and the plurality of back surface grid squares Gb are set as the arrangement portions of the back surface of the two-dimensional user interface object Dp. Therefore, when the two-dimensional user interface displaying the back surface of the two-dimensional user interface object Dp is used, a sticker S disposed in a back surface grid square Gb is disposed on the back surface of the ball item B through the capsule D.

Although in the foregoing, the plurality of front surface grid squares Gf or back surface grid squares Gb arranged in a grid pattern are used to set arrangement portions for stickers S as a non-limiting example, the front surface grid squares Gf or the back surface grid squares Gb may not be used for arrangement portions for stickers S in the two-dimensional user interface. For example, a sticker S may be disposed at any location relative to the two-dimensional user interface object Dp, or arrangement portions that are configured in other grid patterns or other array patterns (e.g., radial patterns, concentric patterns, etc.) may be set.

A sticker S whose type and arrangement location on a capsule D have been set using the two-dimensional user interface serves as an item that decorates a ball item B when the capsule D is attached to the ball item B. Specifically, in the ball item use scene that a ball item B is used, a sticker S decorates the ball item B by adding an effect that is produced by the ball item B according to the type thereof. For example, a star-shaped sticker S1 illustrated in FIG. 10 adds a twinkling star effect in the ball item use scene. A snow-shaped sticker S2 adds a snow flurry effect in the ball item use scene. An electric sticker S3 adds a lightning effect in the ball item use scene. It should be noted that the locations and number of added effects may be changed according to the locations and number of disposed stickers S. For example, an angle and a location of an effect corresponding to a sticker S with reference to a ball item B in the ball item use scene may be set based on an angle and a location of the sticker S with reference to a center of the two-dimensional user interface object Dp.

In FIG. 12, when the user chooses the three-dimensional user interface, the three-dimensional user interface object Ds and the sticker palette P are displayed on the display 12. It should be noted that the three-dimensional user interface object Ds is a three-dimensional spherical object, and in the non-limiting example of FIG. 12, an image of the three-dimensional user interface object Ds that is taken when viewed from a predetermined direction is displayed.

Like the two-dimensional user interface, the sticker palette P shows a plurality of types of previously prepared stickers S that can be added to and disposed on a capsule D. Similarly, when the three-dimensional user interface is used, the user is allowed to perform an operation of choosing any sticker S that the user desires to add to a capsule D, from a plurality of stickers S in the sticker palette P.

A sticker S chosen by the user is disposed on a surface of the three-dimensional user interface object Ds which is closer to the user, at a location designated according to the user's operation. In the present non-limiting example, a sticker S can be disposed on a spherical surface portion closer to the user and excluding a hidden surface portion not viewed from the user, of the spherical surface of the three-dimensional user interface object Ds, at any designated location.

It should be noted that when the user interface is switched from the two-dimensional user interface to the three-dimensional user interface with stickers S disposed on the two-dimensional user interface object Dp through the two-dimensional user interface, the three-dimensional user interface is displayed with the stickers S disposed at arrangement locations on the three-dimensional user interface object Ds corresponding to the arrangement locations of the stickers S on the two-dimensional user interface object Dp. For example, as illustrated by the stickers S1-S3 of FIG. 10 and the stickers S1-S3 of FIG. 12, the user interface is switched from the two-dimensional user interface to the three-dimensional user interface with the types and arrangement locations of stickers S disposed on a capsule D maintained. It should be noted that while a sticker S can be disposed at any location in the three-dimensional user interface, a sticker S is disposed in one of the grid squares G in the two-dimensional user interface, and therefore, the two-dimensional user interface has a lower degree of freedom of the arrangement locations of stickers S. Therefore, when the user interface is switched from the three-dimensional user interface to the two-dimensional user interface, the type and arrangement locations of stickers S may be set in the two-dimensional user interface such that the sticker S is disposed in a grid square G that is closest to the arrangement location of the sticker S that was taken when the sticker S was disposed on a capsule D in the three-dimensional user interface. It should be noted that when the user interface is switched between the two-dimensional user interface and the three-dimensional user interface, all stickers S may be removed from their arrangement locations.

As illustrated by a sticker S4 indicated by a dashed line, a sticker S disposed on a hidden surface portion not viewed from the user of the spherical surface of the three-dimensional user interface object Ds in the three-dimensional user interface is also displayed. For example, if the three-dimensional user interface object Ds is configured by a drawing process using a translucent object that allows a sticker S that is disposed on the back surface and is therefore originally hidden and invisible to be seen, all stickers S disposed on the three-dimensional user interface object Ds can be visually recognized.

During editing of a capsule D using the three-dimensional user interface, the three-dimensional user interface object Ds can be rotated and displayed according to a rotation instruction based on the user's operation input. For example, if a rotation instruction is performed that causes the three-dimensional user interface object Ds of FIG. 12 to rotate clockwise as viewed form above (direction indicated by an arrow in FIG. 13), an image the three-dimensional user interface object Ds that is taken when viewed from a certain direction as illustrated in FIG. 13 is displayed. Due to this rotation instruction, the sticker S1, which was disposed closer to the user, is moved to the back side and is represented by a dashed line, and the display locations of the stickers S2 and S3 are moved to the left, and the sticker S4, which was disposed on the back side, is moved to the front side and displayed. In the non-limiting example of FIG. 13, the three-dimensional user interface object Ds is rotated horizontally according to a rotation instruction based on the user's operation input. Alternatively, the three-dimensional user interface object Ds can also be rotated vertically according to the rotation instruction.

Thus, in the case where the three-dimensional user interface object Ds is configured to be rotatable, the user can dispose a sticker S at any location on the entire surface of the three-dimensional user interface object Ds. Like when the two-dimensional user interface is used, a sticker S whose type and arrangement location on a capsule D have been set using the three-dimensional user interface, serves as an item that decorates a ball item B when the capsule D is attached to the ball item B. This allows the user to choose and use the two-dimensional user interface or the three-dimensional user interface, depending on which is easy for the user to use, in order to dispose a sticker S to edit a capsule D.

In the present non-limiting example, when a preview instruction is performed according to the user's operation during editing of a capsule D, a preview image for checking an effect that will be exhibited when the capsule D, being edited, is used. For example, in the preview display, the use can previously check what kind of ball capsule use scene will be displayed with a capsule D which is being edited attached to a ball item B with a character C contained therein. It should be noted that in the preview display, the same scene image may be repeatedly displayed until a preview end instruction is performed according to the user's operation, or alternatively, after a preview image is displayed at least one time, the display image may be automatically returned to an editing image for a capsule D. If a capsule D which is being edited is already attached to a ball item B with a character C contained therein, the preview display is performed based on the attached state. Alternatively, if a capsule D is being edited without being attached to a ball item B, the preview display may be performed with the capsule D attached to a ball item B previously prepared for preview. An image of a ball item B displayed in the preview display may or may not be decorated with a capsule D attached to the ball item B and/or stickers S disposed on the capsule D.

For example, if a capsule D that is being edited as illustrated in FIGS. 10-13 is attached to a ball item B with a character C contained therein, an effect such as that illustrated in FIG. 14 is displayed as a preview. In the preview display, a ball item B is displayed in a virtual space for the preview display with a capsule D which is being edited attached thereto, and a scene is displayed in which a character C appears from the ball item B when the player character PC, which is disposed in the virtual space, uses the ball item B.

For example, in a scene that a character C appears from a ball item B, an effect is added based on the types and locations of stickers S disposed on a capsule D. As a non-limiting example, a scene is displayed to which an effect is added based on the types and arrangement of stickers S disposed on the two-dimensional user interface object Dp or the three-dimensional user interface object Ds which is being used to edit a capsule D.

For example, on the front surface of the two-dimensional user interface object Dp of FIG. 10, the star-shaped sticker S1 is disposed at a lower left portion, the snow-shaped sticker S2 is disposed at a lower right portion, and an electric sticker S3 is disposed at an upper right portion, with reference to a center of the two-dimensional user interface object Dp. Based on the types and arrangement of the stickers S1-S3, an twinkling star effect E1 is added to a lower left portion, a snow flurry effect E2 is added to a lower right portion, and a lightning effect E3 is added to an upper right portion, with reference to an appearing character C, in the preview image of FIG. 14. On the back surface of the two-dimensional user interface object Dp of FIG. 11, the star-shaped sticker S4 is disposed at an upper left portion with reference to a center of the two-dimensional user interface object Dp. Based on the type and arrangement of the sticker S4, a twinkling star effect E4 is added to an upper right portion in the preview image of FIG. 14 corresponding to an upper left portion of the back surface with reference to an appearing character C.

These effects may be exhibited at the same time or with timing that varies depending on the type and arrangement location (e.g., a distance from a center of the two-dimensional user interface object Dp) of a sticker S. The effects may be exhibited immediately before, simultaneously with, or immediately after the appearance of a character C in the virtual space, or alternatively, with timing that is different from the timing of the appearance of a character C and varies depending on the arrangement location or type of a sticker S. The magnitude or degree of an exhibited effect may be the same or may vary depending on the arrangement location and type of a sticker S.

Although in the foregoing, an example has been described in which a ball item B is decorated with stickers S through a capsule D that can be attached to a spherical ball item B, the ball item B and the capsule D may be in other shapes. For example, in a non-limiting embodiment, an item that is in another three-dimensional shape such as a cube may be decorated through a capsule that can be attached to all or a part of the surface of the item. In such other non-limiting embodiments, the shape of the two-dimensional user interface object Dp or the three-dimensional user interface object Ds may not be circular or spherical, or may be in a shape representing a capsule D or a ball item B (e.g., a polygonal or polyhedral shape). What is disposed on a capsule D to decorate a ball item B may not be a material such as a sticker that is attached thereto, and may be a three-dimensional decorative item that is attached thereto, a liquid such as a paint that is applied for decoration, a pattern, a character, or the like that is drawn for decoration, an opening that is formed for decoration, a deformation of itself for decoration, or the like.

When an acceptance instruction based on the user's operation is performed on a capsule D that has been edited using the two-dimensional user interface and/or the three-dimensional user interface, the types and arrangement of stickers S on the capsule D at the time that the acceptance instruction has been performed are accepted, and management information stored in a storage medium (e.g., the DRAM 85) is updated. In a subsequent game, the configurations of the edited capsule D and a ball item B managed in the management information can each be used. In the present non-limiting example, the result of editing of a plurality of capsules D that are attached or are not attached to a ball item B is accepted, and can be managed for use in a subsequent game.

For example, FIG. 15 illustrates a non-limiting example of a capsule list image showing accepted capsules D. The capsule list image shows a list of capsules D that have been completely edited with the capsules D attached or not attached to a ball item B, i.e., the editing has been finished (the result of the editing has been accepted by the user). For example, in FIG. 15, it is illustrated that for a capsule D1, the result of editing stickers S attached to a ball item B with a character C1 contained therein has been accepted and is managed. It is also illustrated that for a capsule D2, the result of editing stickers S attached to a ball item B with a character C2 contained therein has been accepted and is managed. It is also illustrated that for a capsule D3, the result of editing stickers S attached to a ball item B with a character C3 contained therein has been accepted and is managed. It is also illustrated that for a capsule D4, the result of editing stickers S not attached to a ball item B has been accepted and is managed. It should be noted that the capsule list image may include an image showing a capsule D for which editing has not been completed and therefore is not yet decorated.

It should be noted that according to the user's operation, a capsule D shown in the capsule list image can be attached to one chosen from a plurality of ball items B, a ball item B to which a capsule D shown in the capsule list image is attached can be replaced with another ball item B, and a ball item B to which a capsule D shown in the capsule list image is attached can be removed from the capsule D. In addition, according to the user's operation, editing of a capsule D shown in the capsule list image can be started, and the types and arrangement of stickers S that have been once accepted for the capsule D can be changed and accepted again. Even when any of the user's operations is performed, the management information is updated with a changed configuration of a capsule D and a ball capsule B. Thus, the capsule list image shows management information indicating a plurality of editing results (types and arrangement) of stickers S using the two-dimensional user interface and/or the three-dimensional user interface, and management information in which one of a plurality of ball items B designated according to the user's operation is associated with one of a plurality of editing results of stickers S designated according to the user's operation.

In an image of a capsule D shown in the capsule list image, an image of a sticker S disposed on the capsule D may or may not be added. An image of a capsule D shown in the capsule list image may be an image of the two-dimensional user interface object Dp or an image representing that object, or an image of the three-dimensional user interface object Ds or an image representing that object.

When a ball item use scene is displayed using, in a subsequent game, any of pairs of a ball item B and a capsule D managed in the capsule list image, an effect added by a sticker S is similar to that described above concerning the preview image display.

Figure 16:
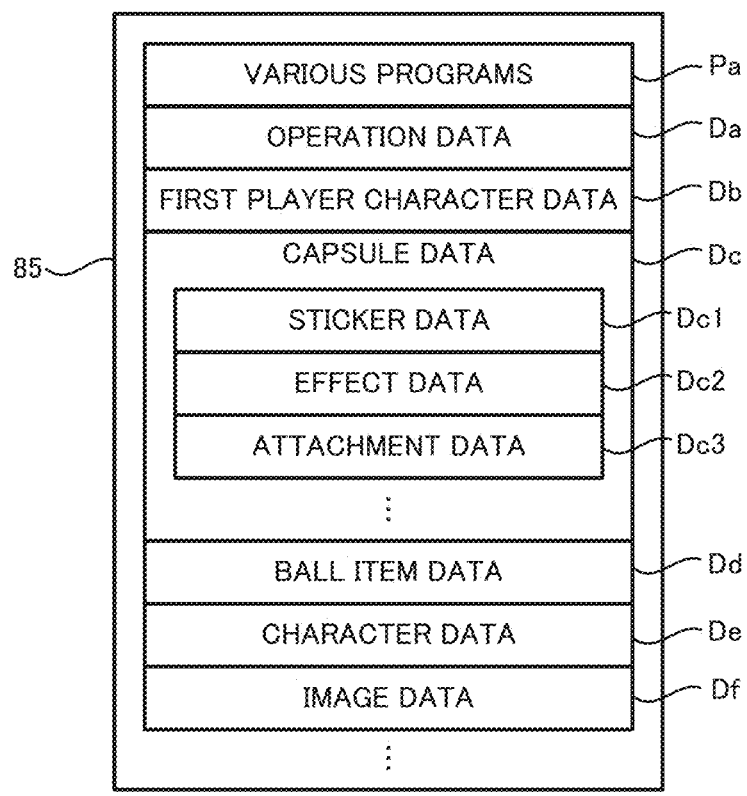
FIG. 16 is a diagram illustrating a non-limiting example of a data area set in a DRAM 85 of a main body apparatus 2 in the present non-limiting example.

Next, a non-limiting example of a specific process that is executed by the game system 1 in the present non-limiting example will be described with reference to FIGS. 16-18. FIG. 16 is a diagram illustrating a non-limiting example of a data area set in the DRAM 85 of the main body apparatus 2 in the present non-limiting example. It should be noted that in addition to the data of FIG. 16, the DRAM 85 also stores data that is used in other processes, which will not be described in detail.

Various programs Pa that are executed in the game system 1 are stored in a program storage area of the DRAM 85. In the present non-limiting example, the programs Pa include an application program (e.g., a game program) for performing information processing based on data obtained from the left controller 3 and/or the right controller 4, and the main body apparatus 2. It should be noted that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present non-limiting example, the DRAM 85 stores operation data Da, player character data Db, capsule data Dc, ball item data Dd, character data De, image data Df, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present non-limiting example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The player character data Db indicates an arrangement location and an arrangement orientation, an action, a state, and the like of the player character PC that are taken when the player character PC is disposed in the virtual space.

The capsule data Dc indicates a setting state of each capsule D. The capsule data Dc includes sticker data Dc1, effect data Dc2, attachment data Dc3, and the like for each capsule D. The sticker data Dc1 indicates the types and arrangement locations of stickers S disposed on a capsule D. The effect data Dc2 indicates the types and occurrence locations of effects that are added when a capsule D is used with the capsule D attached to a ball item B. The attachment data Dc3 indicates whether or not a capsule D is attached to a ball item B, and is used to associate a ball item B with a capsule D attached thereto (and a character C contained therein) with the capsule D.

The ball item data Dd indicates the type of a character contained in each ball item B, the arrangement location and state of each ball item B in the virtual space, and the like.

The character data De indicates the arrangement location and arrangement orientation, and an action and a state in the virtual space, of a character C disposed in the virtual space.

The image data Df is for displaying, on a display screen (e.g., the display 12 of the main body apparatus 2), an image (e.g., an image of the player character PC, an image of a character C, an image of a ball item B, an effect image, an image of another object, an image used in a user interface, an image of the virtual space, a background image, etc.).

Next, a specific non-limiting example of a game process in the present non-limiting example will be described with reference to FIGS. 17 and 18. FIG. 17 is a flowchart illustrating a non-limiting example of a game process that is executed in the game system 1. FIG. 18 is a subroutine illustrating a specific non-limiting example of a capsule editing process that is performed in step S128 of FIG. 17. In the present non-limiting example, a series of processes illustrated in FIGS. 17 and 18 are executed by the processor 81 executing a predetermined application program (game program) included in the programs Pa. The information processes of FIGS. 17 and 18 are started with any suitable timing.

Figure 17:
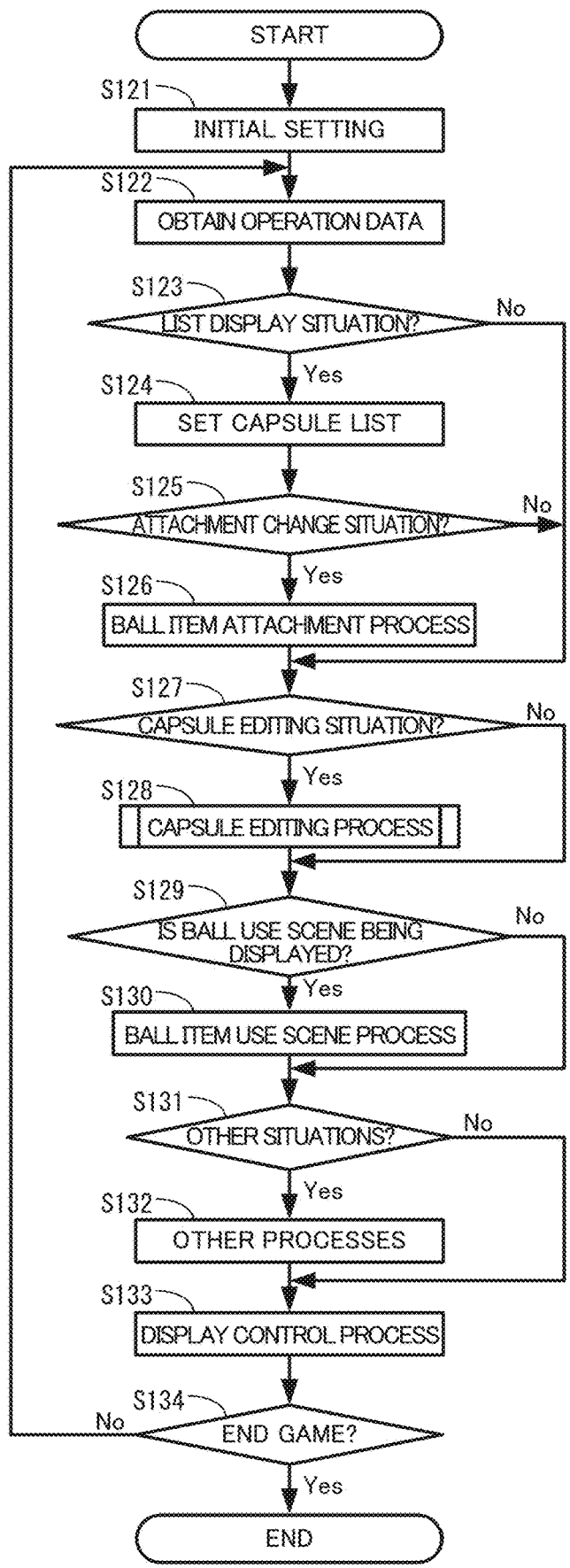
FIG. 17 is a flowchart illustrating a non-limiting example of a game process that is executed in a game system 1.
Figure 18:
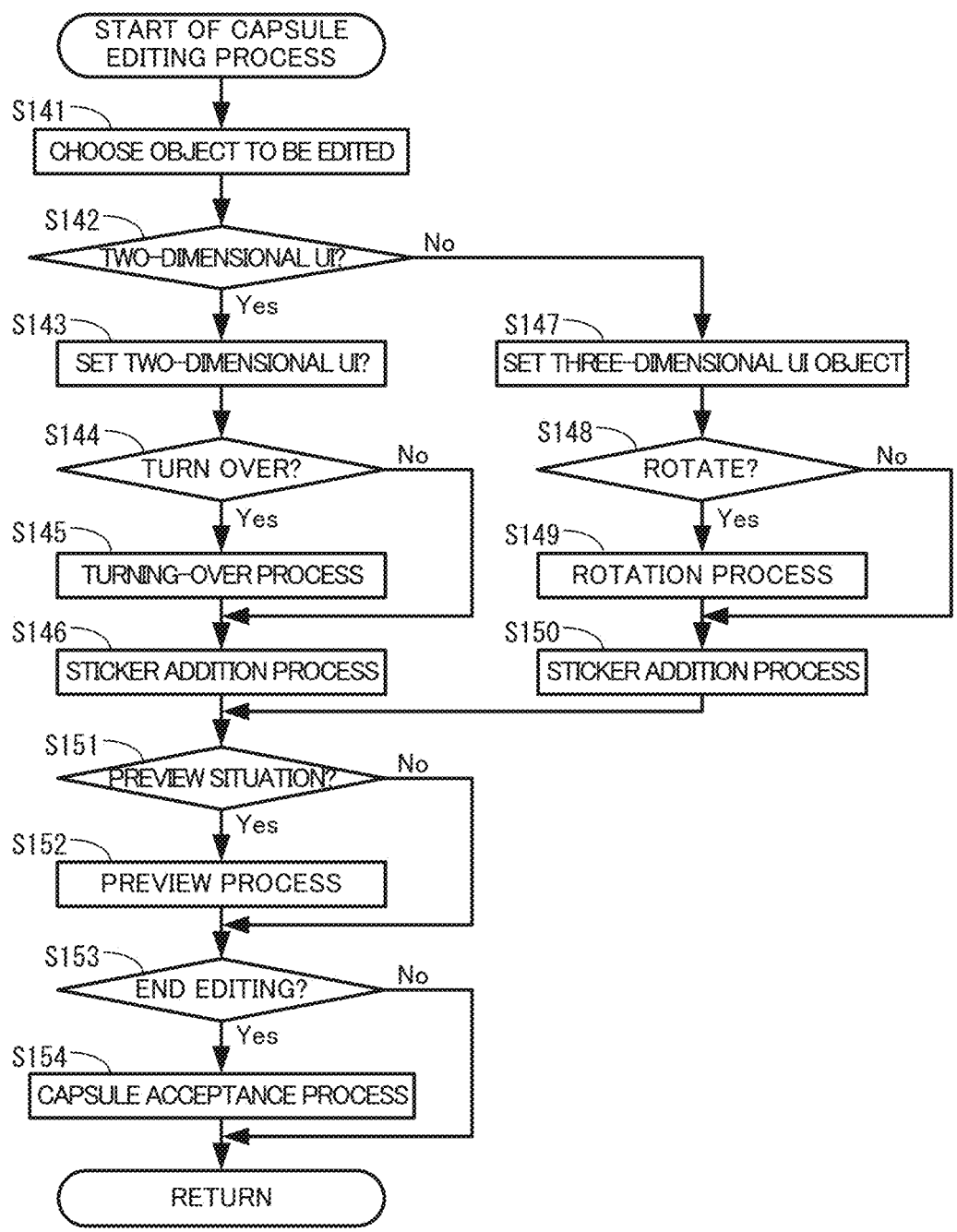
FIG. 18 is a subroutine illustrating a specific non-limiting example of a capsule editing process that is performed in step S128 of FIG. 17.

It should be noted that the steps in the flowchart of FIGS. 17 and 18, which are merely illustrative, may be executed in a different order, or another step may be executed in addition to (or instead of) each step, if a similar effect is obtained. In the present non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIGS. 17 and 18 may be executed by a plurality of information processing apparatuses including the main body apparatus 2 cooperating with each other.

In FIG. 17, the processor 81 performs initial setting for the information process (step S121), and proceeds to the next step. For example, in the initial setting, the processor 81 initializes parameters for performing processes described below.

Next, the processor 81 obtains operation data from each of the left controller 3, the right controller 4, and/or the main body apparatus 2, and updates the operation data Da (step S122), and proceeds to the next step.

Next, the processor 81 determines whether or not the capsule list image should be displayed, based on the operation data Da (step S123). If the operation data Da indicates an instruction to display the capsule list image or the capsule list image is already being displayed, the processor 81 proceeds to step S124. Otherwise, if the operation data Da does not indicate an instruction to display the capsule list image and the capsule list image is not being displayed, or if the operation data Da indicates another instruction different from an instruction to display the capsule list image, the processor 81 proceeds to step S127.

In step S124, the processor 81 sets a capsule list, and proceeds to the next step. For example, the processor 81 generates or updates objects constituting a capsule list indicating a state of each capsule D currently set, with reference to the capsule data Dc. It should be noted that the capsule list is similar to that described above with reference to FIG. 15, and will not here be described in detail.

Next, the processor 81 determines whether or not an attachment state to a ball item B is being changed (step S125). If the operation data Da indicates an instruction to change the attachment state to a ball item B of any of the capsules D displayed in the capsule list image, or if the attachment state to a ball item B is being changed, the processor 81 proceeds to step S126. Otherwise, if the operation data Da does not indicate an instruction to change the attachment state to a ball item B, the processor 81 proceeds to step S127.

In step S126, the processor 81 performs a ball item attachment process, and proceeds to step S127. As a non-limiting example, the processor 81 chooses one from a plurality of ball items B to which a capsule D is to be attached, based on the operation data Da, and attaches the capsule D chosen from the capsule list image to the chosen ball item B, and updates the capsule data Dc with the attachment state. As another non-limiting example, the processor 81 removes a capsule D chosen from the capsule list image and attached to a ball item B, from the ball item B, based on the operation data Da, and updates the capsule data Dc with the removal state. It should be noted that typically, a capsule D is allowed to be attached to a ball item B when a character C is already contained in the ball item B. Therefore, in step S126, a character C and a capsule D designated by the user are managed in association with each other.

In step S127, the processor 81 determines whether or not capsule editing should be performed, based on the operation data Da. If the operation data Da indicates an instruction to perform capsule editing or if capsule editing is already being performed, the processor 81 proceeds to step S128. Otherwise, if the operation data Da does not indicate an instruction to perform capsule editing and capsule editing is not being performed, or if the operation data Da indicates another instruction different from an instruction to perform capsule editing, the processor 81 proceeds to step S129.

In step S128, the processor 81 executes a capsule editing process, and proceeds to step S129. The capsule editing process of step S128 will be described below with reference to FIG. 18.

In FIG. 18, the processor 81 sets an item to be edited in the capsule editing process according to the user's operation (step S141), and proceeds to the next step. For example, the processor 81 sets, as an item to be edited, one chosen from a plurality of capsules D displayed in the capsule list image, based on the operation data Da.

Next, the processor 81 determines whether or not the user has chosen the two-dimensional user interface or the three-dimensional user interface in order to edit a capsule D, based on the operation data Da (step S142). If the two-dimensional user interface has been chosen according to the user's instruction operation, the processor 81 proceeds to step S143. Otherwise, if the three-dimensional user interface has been chosen according to the user's instruction operation, the processor 81 proceeds to step S147. It should be noted that a computer that selectively switches a user interface between a first user interface and a second user interface according to a choice instruction based on an operation input corresponds to, as a non-limiting example, the processor 81 performing step S142.

In step S143, the processor 81 sets the two-dimensional user interface object Dp. and proceeds to the next step. For example, the processor 81 disposes stickers S at designated locations on the two-dimensional user interface object Dp with reference to the capsule data Dc of an item to be edited, and disposes or updates the two-dimensional user interface object Dp in the virtual space with the stickers S disposed thereon. It should be noted that the two-dimensional user interface object Dp and stickers S are similar to those described above with reference to FIG. 10, and will not here be described.

Next, the processor 81 determines whether or not to turn over the two-dimensional user interface object Dp (step S144). For example, if the operation data Da indicates that an instruction to turn over the two-dimensional user interface object Dp has been performed, the result of the determination by the processor 81 in step S144 is positive. If the processor 81 determines to turn over the two-dimensional user interface object Dp, the processor 81 proceeds to step S145. Otherwise, if the processor 81 determines not to turn over the two-dimensional user interface object Dp, the processor 81 proceeds to step S146.

In step S145, the processor 81 executes a turning-over process, and proceeds to step S146. For example, the processor 81 turns over and sets the two-dimensional user interface object Dp, and disposes stickers S at designated locations on the turned-over two-dimensional user interface object Dp with reference to the capsule data Dc of an item to be edited. It should be noted that the turned-over two-dimensional user interface object Dp and stickers S are similar to those described above with reference to FIG. 11, and will not here be described in detail. A computer that chooses a front surface or a back surface according to an operation input and disposes decorative objects at designated locations on the chosen front or back surface corresponds to, as a non-limiting example, the processor 81 performing step S145.

In step S146, the processor 81 executes a sticker addition process, and proceeds to step S151. For example, if the operation data Da indicates that an instruction to change the type and arrangement of a sticker disposed on a capsule D such as an instruction to dispose a new sticker S or an instruction to move or remove a disposed sticker S has been performed, the processor 81 changes the sticker S on the two-dimensional user interface object Dp based on the changed type and arrangement of the sticker S, and updates the capsule data Dc. It should be noted that a computer that displays a two-dimensional user interface object indicating an arrangement range of decorative items, and disposes decorative items at locations in the range on the two-dimensional user interface object designated according to an operation input corresponds to, as a non-limiting example, the processor 81 performing steps S143 and S146 and step S133 described below.

Otherwise, if it is determined in step S142 that the user has chosen the three-dimensional user interface, the processor 81 sets the three-dimensional user interface object Ds, and proceeds to the next step. For example, the processor 81 disposes stickers S at designated locations on the three-dimensional user interface object Ds with reference to the capsule data Dc of an item to be edited, and disposes or updates the three-dimensional user interface object Ds in the virtual space with the stickers S disposed thereon. It should be noted that the three-dimensional user interface object Ds and stickers S are similar to those described above with reference to FIG. 12, and will not here be described in detail.

Next, the processor 81 determines whether or not the three-dimensional user interface object Ds should be rotated (step S148). For example, if the operation data Da indicates that an instruction to rotate the three-dimensional user interface object Ds has been performed, the result of the determination by the processor 81 in step S148 is positive. If the three-dimensional user interface object Ds should be rotated, the processor 81 proceeds to step S149. Otherwise, if the three-dimensional user interface object Ds should not be rotated, the processor 81 proceeds to step S150.

In step S149, the processor 81 executes a rotation process, and proceeds to step S150. For example, the processor 81 rotates the three-dimensional user interface object Ds in the virtual space according to an operation, or controls a virtual camera so that the viewpoint of the virtual camera is rotated and moved relative to the three-dimensional user interface object Ds, for example, and thereby updates a positional relationship so that the three-dimensional user interface object Ds is rotated relative to the viewpoint of the virtual camera. It should be noted that the rotated three-dimensional user interface object Ds and stickers S are similar to those described above with reference to FIG. 12, and will not here be described in detail. A computer that when a second user interface is chosen, rotates a three-dimensional user interface according to an operation input, and disposes decorative objects at designated locations on a front surface of the object closer to the user, corresponds to, as a non-limiting example, the processor 81 performing step S149.

In step S150, the processor 81 executes a sticker addition process, and proceeds to step S151. For example, if the operation data Da indicates that an instruction to change the type and arrangement of a sticker S disposed on a capsule D such as an instruction to dispose a new sticker S or an instruction to move or remove a disposed sticker S has been performed, the processor 81 changes the sticker S on the three-dimensional user interface object Ds according to the instruction, and updates the capsule data Dc based on the changed type and arrangement of the sticker S. It should be noted that a computer that displays a three-dimensional user interface object indicating an arrangement range of decorative items, and disposes decorative items at locations in the range on the three-dimensional user interface object designated according to an operation input, corresponds to, as a non-limiting example, the processor 81 performing steps S147 and S150, and step S133 described below.

In step S151, the processor 81 determines whether or not to perform preview display. For example, if the operation data Da indicates that an instruction to perform preview display has been performed or if preview display is being performed, the processor 81 proceeds to step S152. Otherwise, if the operation data Da does not indicate an instruction to perform preview display and preview display is not being performed, or if the operation data Da indicates another instruction different from an instruction to perform preview display, the processor 81 proceeds to step S153.

In step S152, the processor 81 executes a preview process, and proceeds to step S153. For example, the processor 81 executes an animation process for performing preview display using a capsule D that is an item to be edited with reference to the capsule data Dc. As a result, a scene is displayed in which an effect based on the types and arrangement of stickers S disposed on the capsule D as an item to be edited. It should be noted that the preview display is similar to that described with reference to FIG. 14, and will not here be described in detail. A computer that displays a first item, and performs preview display to display a scene based on the types and arrangement of decorative items disposed on a two-dimensional user interface object or a three-dimensional user interface object associated with the first item, corresponds to, as a non-limiting example, the processor 81 performing step S152 and step S133 described above.

In step S153, the processor 81 determines whether or not to end editing of an item to be edited, based on the user's operation. If the operation data Da indicates an instruction to end editing, the processor 81 proceeds to step S154. Otherwise, if the operation data Da does not indicate an instruction to end editing, the processor 81 ends the subroutine.

In step S154, the processor 81 executes a capsule acceptance process, and ends the subroutine. For example, the processor 81 ends the process of updating the capsule data Dc indicating the types and arrangement of stickers S for a capsule D as an item to be edited at the time that an instruction to end editing is performed, and accepts the resultant capsule data Dc of the item to be edited. It should be noted that a computer that stores, into a storage medium, the types and arrangement of decorative items on a two-dimensional object, or the types and arrangement of decorative items on a three-dimensional object, according to a determination instruction based on an operation input corresponds to, as a non-limiting example, the processor 81 performing step S154.

Referring back to FIG. 17, in step S129, the processor 81 determines whether or not a scene that a ball item B is used is being displayed in a game, based on the user's operation. If a scene that a ball item B is used is being displayed in a game, the processor 81 proceeds to step S130. Otherwise, if a ball item B is not used in a game, the processor 81 proceeds to the step S131.

In step S130, the processor 81 executes a ball item use scene process, and proceeds to step S131. For example, the processor 81 chooses a ball item B to be used in the ball item use scene process, and causes the player character PC to perform an action of throwing the ball item B in the virtual space. While an effect based on the setting of a capsule D attached to the thrown ball item B is added, a character C contained in the ball item B is caused to appear in the virtual space, and the ball item data Dd and the character data De are updated, so that a ball item use scene is set. During the ball item use scene process, animation showing the above series of events is caused to continue on a frame-by-frame basis. It should be noted that the ball item use scene is similar to that described above with reference to FIGS. 8 and 9, and the added effect is similar to that described above with reference to FIG. 14, and will not here be described in detail. A computer that in an item use situation that a first item is used in a game, displays the first item, and displays a scene based on the types and arrangement of decorative items associated with the first item corresponds to, as a non-limiting example, the processor 81 performing step S130 and step S133 described below.

In step S131, the processor 81 determines whether or not another situation is being displayed in a game. If another situation different from the situation based on steps S123-S130 is being displayed in a game, the processor 81 proceeds to step S132. Otherwise, if any different situation is not being displayed in a game, the processor 81 proceeds to step S133.

In step S132, the processor 81 executes other processes related to the progression of a game, and proceeds to step S133. As a non-limiting example, the processor 81 causes the player character PC to perform an action, based on the operation data Da, actions of other virtual objects, a virtual physical calculation in the virtual space, and the like, and updates the player character data Db. The processor 81 also causes a character C disposed in the virtual space to perform an action, based on the operation data Da, a predetermined action algorithm, actions of other virtual objects, a virtual physical calculation in the virtual space, and the like, and updates the character data De. The processor 81 also puts a character C into a ball item B according to an action of putting the character C into the ball item B performed by the player character PC, and updates the ball item data Dd and the character data De. The processor 81 also causes other objects disposed in the virtual space, based on an action of the player character PC, a predetermined action algorithm, and a virtual physical calculation in the virtual space.

In step S133, the processor 81 executes a display control process, and proceeds to the next step. For example, the processor 81 performs control to generate an image for editing a virtual space image or a capsule D based on the process results of steps S122-S132, the player character data Db, the capsule data Dc, the ball item data Dd, the character data De, and the like, and to display the image on the display 12.

Next, the processor 81 determines whether or not to end the game process (step S134). The condition for ending the game process in step S134 is, for example, that the condition for ending the game process is satisfied, that the user performs an operation of ending the game process, etc. If the processor 81 does not determine to end the game process, the processor 81 returns to step S122, and repeats the process. If the processor 81 determines to end the game process, the processor 81 ends the process of the flowchart. Thereafter, steps S122-S134 are repeatedly executed until the processor 81 determines, in step S134, to end the game process.

Thus, in the present non-limiting example, a capsule that is attached to a ball item B can be decorated by selectively using a two-dimensional user interface or a three-dimensional user interface, and therefore, convenience can be improved in decorating an item.

It should be noted that the game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of causing a player character PC to perform an action may be, instead of the left controller 3, the right controller 4, or the touch panel 13, another controller, mouse, touchpad, touch panel, trackball, keyboard, directional pad, slidepad, etc.

In the foregoing, the information process (game process) is performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information process can be performed by the processor 81 of the game system 1 executing a predetermined program. Alternatively, all or a portion of the above process may be performed by a dedicated circuit included in the game system 1.

Here, according to the above non-limiting variation, the present non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present non-limiting example.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition. CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present non-limiting example and common technical knowledge. It should be understood throughout the present specification that expression of a singular form includes the concept of its plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present non-limiting example pertain. If there is any inconsistency or conflict, the present specification (including the definitions) shall prevail.

As described above, the present non-limiting example is applicable as a game program, game apparatus, game system, game processing method, and the like that are capable of improving the convenience of performing an operation of decorating an item.

What is claimed is:

1. A non-transitory computer-readable storage medium having stored therein a game program that when executed by a computer of an information processing apparatus, causes the computer to perform operations comprising:
   in a decoration arrangement situation where a plurality of decorative items to be added to a first item are disposed in a game:
      selectively switching a user interface between a first user interface and a second user interface according to a choice instruction based on an operation input,
      in association with the first user interface being chosen, displaying a two-dimensional user interface object indicating an arrangement range of the decorative items to be added to the first item within the first user interface, and disposing the decorative items at locations in the range on the two-dimensional user interface object designated according to an operation input,
      in association with the second user interface being chosen, displaying a three-dimensional user interface object indicating an arrangement range of the decorative items to be added to the first item within the second user interface, and disposing the decorative items at locations in the range on the three-dimensional user interface object designated according to an operation input, and
      storing, into a storage medium, types and arrangement of the decorative items on the two-dimensional object, or types and arrangement of the decorative items on the three-dimensional object, according to a determination instruction based on an operation input; and
   in an item use situation where the first item is used in a game:
      displaying the first item; and
      displaying a scene based on the types and arrangement of the decorative items associated with the first item.

2. The non-transitory computer-readable storage medium according to claim 1, wherein
   a surface of the two-dimensional user interface object that is displayed is allowed to be selectively switched between a front surface and a back surface thereof, and
   the game program further causes the computer to perform operations comprising:
      in association with the first user interface being chosen, choosing the front surface or the back surface according to an operation input, and disposing the decorative items at the designated locations on the chosen front surface or back surface.

3. The non-transitory computer-readable storage medium according to claim 1, wherein
   the two-dimensional user interface object has a plurality of arrangement portions arranged in a grid pattern, and
   the game program further causes the computer to perform operations comprising:
      in association with the first user interface being chosen, disposing the decorative items at the arrangement portions designated according to an operation input.

4. The non-transitory computer-readable storage medium according to claim 1, wherein
   the three-dimensional user interface object is rotatable, and
   the game program further causes the computer to perform operations comprising:
      in association with the second user interface being chosen, rotating the three-dimensional user interface according to an operation input, and disposing the decorative items at the designated locations on a surface of the object closer to a user.

5. The non-transitory computer-readable storage medium according to claim 4, wherein
   the three-dimensional user interface object is a translucent object allowing the decorative items disposed on a back surface of the object to be seen.

6. The non-transitory computer-readable storage medium according to claim 1, wherein
   the first item is a spherical item,
   the two-dimensional user interface object includes a circular object, and
   the three-dimensional user interface object includes a spherical object.

7. The non-transitory computer-readable storage medium according to claim 1, wherein
   the game program further causes the computer to perform operations comprising:
      in association with a preview instruction being performed according to an operation input in the decoration arrangement situation, displaying the first item, and performing preview display that displays a scene based on the types and arrangement of the decorative items disposed on the two-dimensional user interface object or the three-dimensional user interface object associated with the first item.

8. The non-transitory computer-readable storage medium according to claim 1, wherein
the game program further causes the computer to perform operations comprising:
storing, into the storage medium, a plurality of at least any of the types and arrangement of the decorative items disposed on the two-dimensional user interface object, and the types and arrangement of the decorative items disposed on the three-dimensional user interface object, and
storing, into the storage medium, one of a plurality of the first items designated according to an operation input, and the types and arrangement of the decorative items designated according to an operation input in association with each other.

9. The non-transitory computer-readable storage medium according to claim 8, wherein
the plurality of first items are stored in the storage medium in association with a plurality of characters, respectively, used in a game,
in the item use situation, at least any of the plurality of characters appears in a virtual space, and
the game program further causes the computer to perform operations comprising:
in association with displaying the first item associated with the character and causing the character to appear in a game, displaying the scene based on the types and arrangement of the decorative items associated with the first item.

10. The non-transitory computer-readable storage medium according to claim 1, wherein
upon switching from the two-dimensional user interface to the three-dimensional user interface with the decorative items disposed on the two-dimensional user interface object, the three-dimensional user interface is displayed with the decorative items disposed at arrangement locations on the three-dimensional user interface object corresponding to arrangement locations of the decorative items on the two-dimensional user interface object, or
upon switching from the three-dimensional user interface to the two-dimensional user interface with the decorative items disposed on the three-dimensional user interface object, the two-dimensional user interface is displayed with the decorative items disposed at arrangement locations on the two-dimensional user interface object corresponding to arrangement locations of the decorative items on the three-dimensional user interface object.

11. The non-transitory computer-readable storage medium according to claim 1, wherein the two-dimensional user interface object and the three-dimensional user interface object correspond to the first item.

12. A game apparatus, comprising:
a display; and
processing circuitry including at least a processor, wherein the processing circuitry is configured to:
in a decoration arrangement situation that a plurality of decorative items to be added to a first item are disposed in a game:
selectively switch a user interface between a first user interface and a second user interface according to a choice instruction based on an operation input,
in association with the first user interface being chosen, display a two-dimensional user interface object indicating an arrangement range of the decorative items to be added to the first item within the first user interface, and dispose the decorative items at locations in the range on the two-dimensional user interface object designated according to an operation input,
in association with the second user interface being chosen, display a three-dimensional user interface object indicating an arrangement range of the decorative items to be added to the first item within the second user interface, and dispose the decorative items at locations in the range on the three-dimensional user interface object designated according to an operation input, and
store, into a storage medium, types and arrangement of the decorative items on the two-dimensional object, or types and arrangement of the decorative items on the three-dimensional object, according to a determination instruction based on an operation input; and
in an item use situation that the first item is used in a game,
display the first item; and
display a scene based on the types and arrangement of the decorative items associated with the first item.

13. The game apparatus according to claim 12, wherein
a surface of the two-dimensional user interface object that is displayed is allowed to be selectively switched between a front surface and a back surface thereof, and
the processing circuitry is further configured to:
in association with the first user interface being chosen, choose the front surface or the back surface according to an operation input, and dispose the decorative items at the designated locations on the chosen front surface or back surface.

14. The game apparatus according to claim 12, wherein
the two-dimensional user interface object has a plurality of arrangement portions arranged in a grid pattern, and
the processing circuitry is further configured to:
in association with the first user interface being chosen, dispose the decorative items at the arrangement portions designated according to an operation input.

15. The game apparatus according to claim 12, wherein
the three-dimensional user interface object is rotatable, and
the processing circuitry is further configured to:
in association with the second user interface being chosen, rotate the three-dimensional user interface according to an operation input, and dispose the decorative items at the designated locations on a surface of the object closer to a user.

16. The game apparatus according to claim 15, wherein
the three-dimensional user interface object is a translucent object allowing the decorative items disposed on a back surface of the object to be seen.

17. The game apparatus according to claim 12, wherein
the processing circuitry is further configured to:
in association with a preview instruction being performed according to an operation input in the decoration arrangement situation, display the first item, and perform preview display that displays a scene based on the types and arrangement of the decorative items disposed on the two-dimensional user interface object or the three-dimensional user interface object associated with the first item.

18. The game apparatus according to claim 12, wherein the processing circuitry is further configured to:
   store, into the storage medium, a plurality of at least any of the types and arrangement of the decorative items disposed on the two-dimensional user interface object and the types and arrangement of the decorative items disposed on the three-dimensional user interface object, and
   store, into the storage medium, one of a plurality of the first items designated according to an operation input and the types and arrangement of the decorative items designated according to an operation input in association with each other.

19. The game apparatus according to claim 18, wherein the plurality of first items are stored in the storage medium in association with a plurality of characters, respectively, used in a game,
   in the item use situation, at least any of the plurality of characters appears in a virtual space, and
   the processing circuitry is further configured to:
      in association with displaying the first item associated with the character and causing the character to appear in a game, display the scene based on the types and arrangement of the decorative items associated with the first item.

20. A game system, comprising:
   a processor; and
   a memory configured to store computer readable instructions that, when executed by the processor, cause the game system to:
      in a decoration arrangement situation that a plurality of decorative items to be added to a first item are disposed in a game:
         selectively switch a user interface between a first user interface and a second user interface according to a choice instruction based on an operation input,
         in association with the first user interface being chosen, display a two-dimensional user interface object indicating an arrangement range of the decorative items to be added to the first item within the first user interface, and dispose the decorative items at locations in the range on the two-dimensional user interface object designated according to an operation input,
         in association with the second user interface being chosen, display a three-dimensional user interface object indicating an arrangement range of the decorative items to be added to the first item within the second user interface, and dispose the decorative items at locations in the range on the three-dimensional user interface object designated according to an operation input, and
         store, into a storage medium, types and arrangement of the decorative items on the two-dimensional object, or types and arrangement of the decorative items on the three-dimensional object, according to a determination instruction based on an operation input; and
      in an item use situation that the first item is used in a game:
         display the first item; and
         display a scene based on the types and arrangement of the decorative items associated with the first item.

21. The game system according to claim 20, wherein a surface of the two-dimensional user interface object that is displayed is allowed to be selectively switched between a front surface and a back surface thereof, and
   the game system is further caused to:
      in association with the first user interface being chosen, choose the front surface or the back surface according to an operation input, and dispose the decorative items at the designated locations on the chosen front surface or back surface.

22. The game system according to claim 20, wherein the two-dimensional user interface object has a plurality of arrangement portions arranged in a grid pattern, and
   the game system is further caused to:
      in association with the first user interface being chosen, dispose the decorative items at the arrangement portions designated according to an operation input.

23. The game system according to claim 20, wherein the three-dimensional user interface object is rotatable, and
   the game system is further caused to:
      in association with the second user interface being chosen, rotate the three-dimensional user interface according to an operation input, and dispose the decorative items at the designated locations on a surface of the object closer to a user.

24. The game system according to claim 23, wherein the three-dimensional user interface object is a translucent object allowing the decorative items disposed on a back surface of the object to be seen.

25. The game system according to claim 20, wherein the game system is further caused to:
      in association with a preview instruction being performed according to an operation input in the decoration arrangement situation, display the first item, and perform preview display that displays a scene based on the types and arrangement of the decorative items disposed on the two-dimensional user interface object or the three-dimensional user interface object associated with the first item.

26. The game system according to claim 20, wherein the game system is further caused to:
   store, into the storage medium, a plurality of at least any of the types and arrangement of the decorative items disposed on the two-dimensional user interface object and the types and arrangement of the decorative items disposed on the three-dimensional user interface object, and
   store, into the storage medium, one of a plurality of the first items designated according to an operation input and the types and arrangement of the decorative items designated according to an operation input in association with each other.

27. The game system according to claim 26, wherein the plurality of first items are stored in the storage medium in association with a plurality of characters, respectively, used in a game,
   in the item use situation, at least any of the plurality of characters appears in a virtual space, and
   the game system is further caused to:
      in association with displaying the first item associated with the character and causing the character to appear in a game, display the scene based on the types and arrangement of the decorative items associated with the first item.

28. A game processing method, comprising:
in a decoration arrangement situation that a plurality of decorative items to be added to a first item are disposed in a game:
   selectively switching a user interface between a first user interface and a second user interface according to a choice instruction based on an operation input,
   in association with the first user interface being chosen, displaying a two-dimensional user interface object indicating an arrangement range of the decorative items to be added to the first item within the first user interface, and disposing the decorative items at locations in the range on the two-dimensional user interface object designated according to an operation input,
   in association with the second user interface being chosen, displaying a three-dimensional user interface object indicating an arrangement range of the decorative items to be added to the first item within the second user interface, and disposing the decorative items at locations in the range on the three-dimensional user interface object designated according to an operation input, and
   storing, into a storage medium, types and arrangement of the decorative items on the two-dimensional object, or types and arrangement of the decorative items on the three-dimensional object, according to a determination instruction based on an operation input; and
in an item use situation that the first item is used in a game:
   displaying the first item; and
   displaying a scene based on the types and arrangement of the decorative items associated with the first item.

29. The game processing method according to claim 28, wherein
   a surface of the two-dimensional user interface object that is displayed is allowed to be selectively switched between a front surface and a back surface thereof, and
   the game processing method further comprises:
   in association with the first user interface being chosen, choosing the front surface or the back surface according to an operation input, and disposing the decorative items at the designated locations on the chosen front surface or back surface.

30. The game processing method according to claim 28, wherein
   the two-dimensional user interface object has a plurality of arrangement portions arranged in a grid pattern, and
   the game processing method further comprises:
   in association with the first user interface being chosen, disposing the decorative items at the arrangement portions designated according to an operation input.

31. The game processing method according to claim 28, wherein
   the three-dimensional user interface object is rotatable, and
   the game processing method further comprises:
   in association with the second user interface being chosen, rotating the three-dimensional user interface according to an operation input, and disposing the decorative items at the designated locations on a surface of the object closer to a user.

32. The game processing method according to claim 31, wherein
   the three-dimensional user interface object is a translucent object allowing the decorative items disposed on a back surface of the object to be seen.

33. The game processing method according to claim 28, wherein
   the first item is a spherical item,
   the two-dimensional user interface object includes a circular object, and
   the three-dimensional user interface object includes a spherical object.

34. The game processing method according to claim 28, further comprising:
   in association with a preview instruction being performed according to an operation input in the decoration arrangement situation, displaying the first item, and performing preview display that displays a scene based on the types and arrangement of the decorative items disposed on the two-dimensional user interface object or the three-dimensional user interface object associated with the first item.

35. The game processing method according to claim 28, further comprising:
   storing, into the storage medium, a plurality of at least any of the types and arrangement of the decorative items disposed on the two-dimensional user interface object and the types and arrangement of the decorative items disposed on the three-dimensional user interface object, and
   storing, into the storage medium, one of a plurality of the first items designated according to an operation input and the types and arrangement of the decorative items designated according to an operation input in association with each other.

36. The game processing method according to claim 35, wherein
   the plurality of first items are stored in the storage medium in association with a plurality of characters, respectively, used in a game,
   in the item use situation, at least any of the plurality of characters appears in a virtual space, and
   the game processing method further comprises:
   in association with displaying the first item associated with the character and causing the character to appear in a game, displaying the scene based on the types and arrangement of the decorative items associated with the first item.

* * * * *